United States Patent
Saltz et al.

(10) Patent No.: US 12,272,059 B2
(45) Date of Patent: *Apr. 8, 2025

(54) SYSTEM AND METHOD ASSOCIATED WITH PREDICTING SEGMENTATION QUALITY OF OBJECTS IN ANALYSIS OF COPIOUS IMAGE DATA

(71) Applicant: The Research Foundation for The State University of New York, Albany, NY (US)

(72) Inventors: Joel Haskin Saltz, Manhasset, NY (US); Tahsin M. Kurc, Coram, NY (US); Yi Gao, Stony Brook, NY (US); Wei Zhu, Setauket, NY (US); Si Wen, East Setauket, NY (US); Tianhao Zhao, Coram, NY (US); Sampurna Shrestha, Stony Brook, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 18/226,482

(22) Filed: Jul. 26, 2023

(65) Prior Publication Data

US 2024/0177301 A1 May 30, 2024

Related U.S. Application Data

(63) Continuation of application No. 16/605,404, filed as application No. PCT/US2018/032026 on May 10, 2018, now Pat. No. 11,748,877.

(Continued)

(51) Int. Cl.
*G06T 7/00* (2017.01)
*G06F 18/21* (2023.01)
(Continued)

(52) U.S. Cl.
CPC .......... *G06T 7/0012* (2013.01); *G06F 18/214* (2023.01); *G06F 18/217* (2023.01);
(Continued)

(58) Field of Classification Search
CPC ....... G06T 7/0012; G06T 7/0002; G06T 7/11; G06T 7/136; G06T 7/41;
(Continued)

(56) References Cited

U.S. PATENT DOCUMENTS

| | | |
|---|---|---|
| 6,195,459 B1 | 2/2001 | Zhu |
| 7,761,240 B2 | 7/2010 | Saidi et al. |

(Continued)

FOREIGN PATENT DOCUMENTS

| | | |
|---|---|---|
| CN | 102693432 B | 12/2015 |
| CN | 106780499 A | 5/2017 |

(Continued)

OTHER PUBLICATIONS

Written Opinion, International Search Report dated Jul. 23, 2018 for International Application No. PCT/US2018/032026.

(Continued)

*Primary Examiner* — Solomon G Bezuayehu
(74) *Attorney, Agent, or Firm* — Hoffmann & Baron, LLP

(57) ABSTRACT

A method of testing an impedance-sensitive system with a switching device, wherein the method comprises: switching the disconnecting device into the on-state configured to permit transmission of energy via the coil; implementing a first measurement with the impedance-sensitive system; switching the disconnecting device into the off-state configured to permit damping of the external positioning signal that couples into the coil so as to reduce the undesirable oscillations of the coil; implementing a second measurement with the impedance-sensitive system; performing a comparison of the first measurement and the second measurement;

(Continued)

performing a verification of the comparison with a target specification; and displaying a correct function and/or a malfunction depending on the verification.

20 Claims, 16 Drawing Sheets
(5 of 16 Drawing Sheet(s) Filed in Color)

Related U.S. Application Data

(60) Provisional application No. 62/504,819, filed on May 11, 2017.

(51) Int. Cl.
| | |
|---|---|
| *G06F 18/214* | (2023.01) |
| *G06F 18/2431* | (2023.01) |
| *G06T 7/11* | (2017.01) |
| *G06T 7/136* | (2017.01) |
| *G06T 7/41* | (2017.01) |
| *G06V 10/774* | (2022.01) |
| *G06V 20/69* | (2022.01) |

(52) U.S. Cl.
CPC ........ *G06F 18/2431* (2023.01); *G06T 7/0002* (2013.01); *G06T 7/11* (2017.01); *G06T 7/136* (2017.01); *G06T 7/41* (2017.01); *G06V 10/774* (2022.01); *G06V 20/695* (2022.01); *G06T 2207/20021* (2013.01); *G06T 2207/20081* (2013.01); *G06T 2207/30024* (2013.01); *G06T 2207/30168* (2013.01); *G06T 2207/30181* (2013.01)

(58) Field of Classification Search
CPC . G06T 2207/20021; G06T 2207/20081; G06T 2207/30024; G06T 2207/30168; G06T 2207/30181; G06F 18/214; G06F 18/217; G06F 18/2431; G06V 10/774; G06V 20/695

See application file for complete search history.

(56) References Cited

U.S. PATENT DOCUMENTS

| | | | |
|---|---|---|---|
| 8,254,647 B1 * | 8/2012 | Nechyba | G06V 40/165 |
| | | | 382/118 |
| 8,345,940 B2 | 1/2013 | Mattiuzzi et al. | |
| 8,488,863 B2 | 7/2013 | Boucheron | |
| 8,681,222 B2 | 3/2014 | Zhang et al. | |
| 8,768,048 B1 | 7/2014 | Kwatra et al. | |
| 8,824,828 B1 * | 9/2014 | Winn | H04N 25/68 |
| | | | 430/944 |
| 9,366,772 B2 | 6/2016 | Imhof | |
| 9,576,373 B2 | 2/2017 | Shorter et al. | |
| 9,691,395 B1 | 6/2017 | Sieracki | |
| 9,779,492 B1 | 10/2017 | Garnavi et al. | |
| 9,886,945 B1 | 2/2018 | Sieracki | |
| 10,043,054 B2 | 8/2018 | Remiszewski et al. | |
| 10,055,551 B2 | 8/2018 | Agaian et al. | |
| 10,062,172 B2 | 8/2018 | Hougen et al. | |
| 10,083,340 B2 * | 9/2018 | Padmanabhan | G06V 10/255 |
| 10,169,864 B1 | 1/2019 | Bagherinia et al. | |
| 10,169,871 B2 | 1/2019 | Hibbard et al. | |
| 10,229,493 B2 | 3/2019 | Garnavi et al. | |
| 10,242,292 B2 | 3/2019 | Zisimopoulos et al. | |
| 10,289,939 B2 * | 5/2019 | Li | G06F 18/22 |
| 10,410,096 B2 | 9/2019 | Dijkman et al. | |
| 10,499,845 B2 | 12/2019 | Do et al. | |
| 10,535,138 B2 | 1/2020 | Pfeiffer | |
| 10,593,040 B2 | 3/2020 | Zouridakis | |
| 10,657,651 B2 | 5/2020 | Li et al. | |
| 10,668,924 B2 * | 6/2020 | Lee | B60W 30/143 |
| 10,719,936 B2 | 7/2020 | Paschalakis et al. | |
| 10,733,788 B2 | 8/2020 | Ceccaldi et al. | |
| 10,803,328 B1 | 10/2020 | Bai et al. | |
| 10,824,832 B2 * | 11/2020 | Kluckner | G06K 7/1491 |
| 10,825,168 B2 | 11/2020 | Tegzes et al. | |
| 10,861,151 B2 | 12/2020 | Liang et al. | |
| 10,891,778 B2 | 1/2021 | Sutton et al. | |
| 10,984,894 B2 | 4/2021 | Foley et al. | |
| 11,003,923 B2 | 5/2021 | Ghafarianzadeh et al. | |
| 11,151,378 B2 | 10/2021 | Kottenstette et al. | |
| 11,151,417 B2 | 10/2021 | Laradji et al. | |
| 11,157,527 B2 | 10/2021 | Wang et al. | |
| 11,164,312 B2 | 11/2021 | Saltz et al. | |
| 11,170,470 B1 | 11/2021 | He et al. | |
| 11,176,677 B2 | 11/2021 | Fuchs et al. | |
| 11,244,188 B2 | 2/2022 | Cholakkal et al. | |
| 11,263,497 B2 | 3/2022 | Peng | |
| 2002/0165839 A1 | 11/2002 | Taylor et al. | |
| 2006/0002628 A1 * | 1/2006 | Dolan | G06V 30/413 |
| | | | 358/1.9 |
| 2006/0056689 A1 | 3/2006 | Wittebrood et al. | |
| 2009/0092301 A1 | 4/2009 | Jerebko et al. | |
| 2009/0116713 A1 | 5/2009 | Yan | |
| 2009/0141932 A1 * | 6/2009 | Jones | G06V 10/993 |
| | | | 382/100 |
| 2010/0014755 A1 | 1/2010 | Wilson | |
| 2011/0050703 A1 | 3/2011 | Artan et al. | |
| 2012/0148162 A1 | 6/2012 | Zhang et al. | |
| 2012/0257677 A1 | 10/2012 | Bankoski et al. | |
| 2012/0269425 A1 | 10/2012 | Marchesotti et al. | |
| 2013/0173632 A1 | 7/2013 | Birdwell et al. | |
| 2013/0230230 A1 | 9/2013 | Ajemba et al. | |
| 2013/0301910 A1 * | 11/2013 | Mel | G06T 7/143 |
| | | | 382/159 |
| 2014/0193074 A1 * | 7/2014 | Huang | G06V 10/50 |
| | | | 382/180 |
| 2014/0294239 A1 | 10/2014 | Duckett | |
| 2015/0030248 A1 * | 1/2015 | Humphrey | G06T 7/11 |
| | | | 382/170 |
| 2015/0065803 A1 * | 3/2015 | Douglas | G06T 7/143 |
| | | | 600/200 |
| 2015/0138310 A1 | 5/2015 | Fan et al. | |
| 2016/0063720 A1 | 3/2016 | Han et al. | |
| 2016/0188954 A1 * | 6/2016 | Ajemba | G06T 7/0012 |
| | | | 382/128 |
| 2016/0321512 A1 * | 11/2016 | Sarachan | G16H 10/40 |
| 2016/0335478 A1 | 11/2016 | Bredno et al. | |
| 2017/0116744 A1 | 4/2017 | Abedini et al. | |
| 2017/0213339 A1 * | 7/2017 | Hibbard | G06T 7/143 |
| 2017/0231550 A1 | 8/2017 | Do et al. | |
| 2017/0270653 A1 | 9/2017 | Garnavi et al. | |
| 2017/0337711 A1 * | 11/2017 | Ratner | H04N 19/119 |
| 2018/0061059 A1 * | 3/2018 | Xu | G06T 7/174 |
| 2018/0075603 A1 | 3/2018 | Hougen et al. | |
| 2018/0218502 A1 * | 8/2018 | Golden | G06T 7/11 |
| 2018/0276815 A1 * | 9/2018 | Xu | G06V 10/987 |
| 2019/0138786 A1 | 5/2019 | Trenholm et al. | |
| 2019/0188851 A1 | 6/2019 | Zouridakis | |
| 2020/0388028 A1 | 12/2020 | Agus et al. | |
| 2021/0056363 A1 * | 2/2021 | Song | G06V 20/695 |
| 2024/0054639 A1 * | 2/2024 | Nadeem | G06T 7/174 |
| 2024/0371004 A1 * | 11/2024 | Skinner | G06T 11/00 |

FOREIGN PATENT DOCUMENTS

| | | |
|---|---|---|
| CN | 109074500 A | 12/2018 |
| CN | 107077736 B | 2/2022 |
| EP | 2831813 B1 | 11/2019 |
| JP | 2017-510792 A | 4/2017 |
| KR | 101941043 B1 | 1/2019 |
| WO | WO 2009/045471 A1 | 4/2009 |
| WO | WO 2012/096988 A2 | 7/2012 |
| WO | WO 2016/036516 A1 | 3/2016 |

(56) References Cited

FOREIGN PATENT DOCUMENTS

| WO | WO 2016/059385 A1 | 4/2016 |
|---|---|---|
| WO | WO 2019/108888 A1 | 6/2019 |

OTHER PUBLICATIONS

Zheng, Yushan, et al., "Feature Extraction from Histopathological Images Based on Nucleus-Guided Convolutional Neural Network for Breast Lesion Classification," Pattern Recognition 71: pp. 14-25, 2017.

Wen, Si, et al., "A Methodology for Texture Feature-Based Quality Assessment in Nucleus Segmentation of Histopathology Image," Journal of Pathology Informatics 8:38, 2017 (Open access: from http://www.jpathinformatics.org).

Huang, Yue, et al., "A Supervised Learning Framework for Pancreatic Islet Segmentation with Multi-Scale Color- Texture Features and Rolling Guidance Filters," Cytometry Part A, 89, No. 10, pp. 893-902, 2016.

Jelinek, Herbert F., et al., "Quality Control and Multi-Lesion Detection in Automated Retinopathy Classification Using a Visual Words Dictionary," 35th Annual International Conference of the IEEE Engineering in Medicine and Biology Society, pp. 5857-5860, Osaka, Japan, Jul. 3-7, 2013.

Campanella, Gabriele, et al., "Towards Machine Learned Quality Control: A Benchmark for Sharpness Quantification in Digital Pathology," Computerized Medical Imaging and Graphics, 65, pp. 142-151, 2018.

Seyedhosseini, Mojtaba, et al., "Segmentation of Mitochondria in Electron Microscopy Images Using Algebraic Curves", Proc. IEEE Int. Symp Biomed Imaging, 2013, pp. 860-863.

Cook, Benjamin, et al., "Semi-automated land/water segmentation of multi-spectral imagery", Oceans 2015, MTS/IEEE Washington, Oct. 2015.

Chowdhury, S, et al., "Machine Learing Models for Road Surface and Friction Estimation Using Front-Camera Images", 2018 Int'l. Joint Conference on Neural Networkds (IJCNN). http://dx.doi.org/10.1109/IJCNN.2018.8489188.

Gunasekara, P.G.H.H., et al., "Image texture analysis using deep neural networks", IEEE Intl. Conference on Industrial and Information Systems, Dec. 15-16, 2017, Sri Lanka.

Tulpan, Dan, et al., "Detection of clouds in sky/cloud and aerial images using moment bases texture segmentation", 2017 Intl. Conference on Unmanned Aircraft Systems (ICUAS), Jun. 13-16, 2017, Miami, FL, USA.

Thomas, Belvin, et al., "Texture analysis based segmentation and classification of oral cancer lesions color images using ANN", IEEE Intl. Conference on Signal Processing, Computing and Control (ISPCC), Sep. 26-28, 2013, Solan, India.

Mosquera-Lopez, Clara, et al., "Computer-Aided Prostate Cancer Diagnosis From Digitized Histopathology: A Review on Texture-Based Systems", IEEE Reviews in Biomedial Engineering, vol. 8, 2015.

Tudorache, Silvia, et al., "Combining efficient textural features with CNN-Based classifiers to segment regions of interest in aerial images",2017 5th International Symposium on Electrical and Electronics Engineering (ISEEE), Oct. 2017.

Mamapatra, Dwarikanath, "Analyzing Training Information from Random Forests for Improved Image Segmentation", IEEE Transactions on Image Processing, vol. 23, No. 4, Apr. 2014.

Ke, Yongzhen, et al., "An improved image segmentation algorithm using support vector machines", 2011 International Conference on Computer Science and Service System (CSSS), Jun. 27-29, 2011, Nanjing, China.

Ren, Ruoxu, et al., "A Generic Deep-Learning-Based Approach for Automated Surface Inspection", IEEE Transactions on Cybernetics, vol. 48, No. 3, Mar. 2018.

Hoogs, Anthony, et al., "A Common Set of Perceptual Observables for Grouping, Figure-Ground Discrimination, and Texture Classification", IEEE Transactions on Pattern Analysis and Machine Intelligence, vol. 25, No. 4, Apr. 2003.

\* cited by examiner

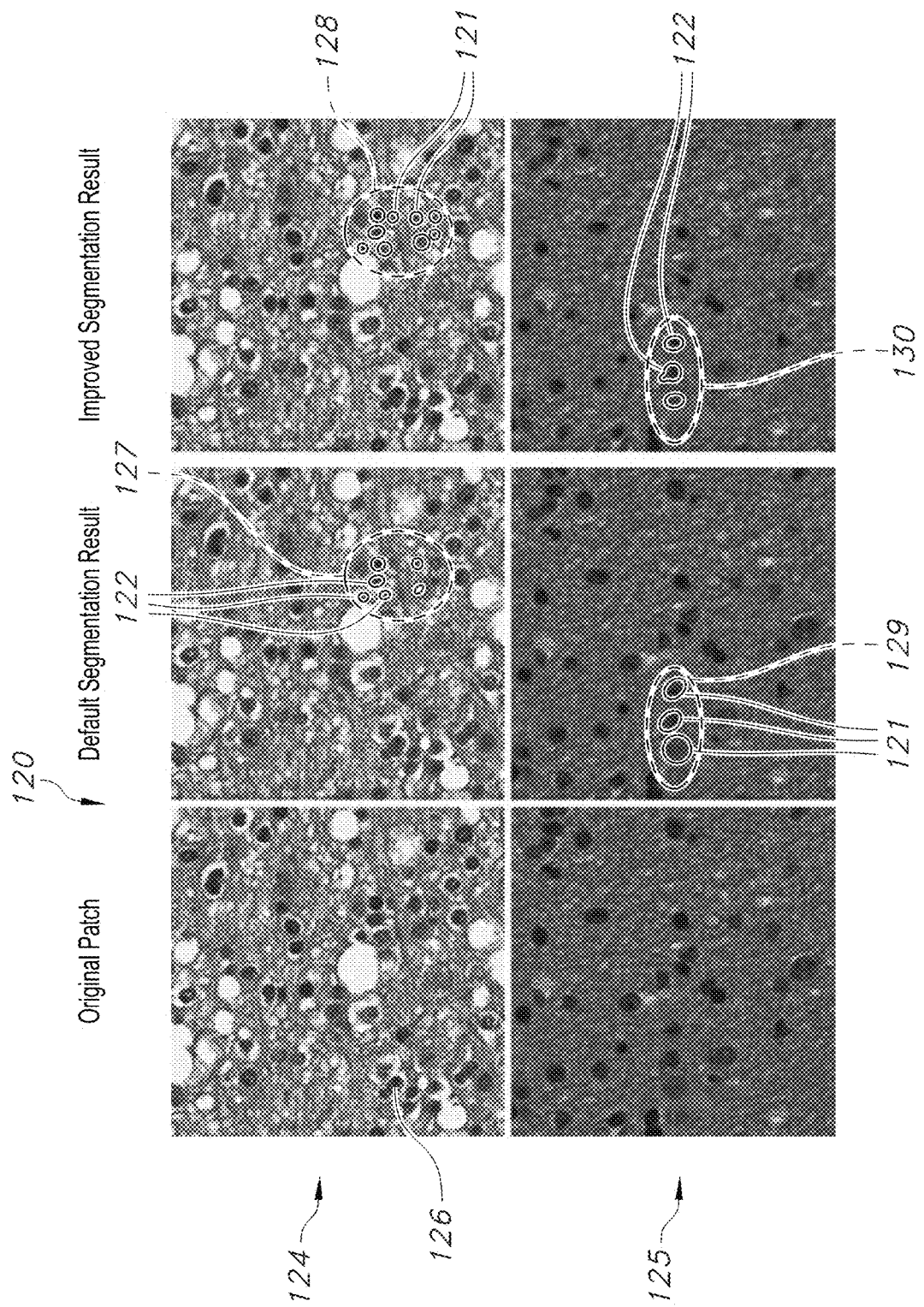

SYSTEM AND METHOD ASSOCIATED WITH PREDICTING SEGMENTATION QUALITY OF OBJECTS IN ANALYSIS OF COPIOUS IMAGE DATA

CROSS-REFERENCE TO RELATED APPLICATION(S)

This application is a continuation of U.S. patent application Ser. No. 16/605,404, filed on Oct. 15, 2019, which is the U.S. National Phase of International Patent Application No. PCT/US2018/032026, filed on May 10, 2018, which claims the benefit of U.S. Provisional Patent Application No. 62/504,819, filed on May 11, 2017, all of which are incorporated herein by reference in their entirety.

FIELD OF THE DISCLOSURE

The present disclosure relates to a system and method associated with predicting segmentation quality of objects used in analysis of copious image data including image data at the patch level. Even more particularly, the present invention relates to a novel system and method that trains a classification model in order to predict the respective labeling of segmentation results, and accordingly the capability to modify the segmentation process in order to improve and refine segmentation of objects used in analysis of copious image data.

BACKGROUND

Recent advances in digital histopathology image analysis and other applications implementing image analysis have resulted in the development of numerous detection classification and segmentation methods for nuclei and other micro-anatomic features and structures. Reliability and performance of such micro-anatomic structure detection, classification and segmentation system and methods vary from specimen to specimen with performance depending on various factors including tissue preparation, staining and imaging. A robust error assessment stage can play a role in assessing quality of micro-anatomic structure detection, classification and segmentation, and essentially facilitating an end-to-end process for whole slide image analysis and quality control of the image analysis process.

Such quality control process is implemented in certain embodiments, for the complex segmentation of nuclei in whole slide tissue images which is considered a common methodology in pathology image analysis. Most segmentation algorithms are sensitive to input algorithm parameters and the characteristics of input images (tissue morphology, staining, etc.). Since there can be large variability in the color, texture, and morphology of tissues within and across cancer types (for example, heterogeneity can exist even within a tissue specimen such that the quality or state of the specimen manifests as non-uniform and/or diverse in character or content), it is likely that a set of input parameters will not perform well across multiple images. It is, therefore, highly desired, and necessary in some cases, to carry out a quality control of such segmentation results.

Image segmentation pipelines often are sensitive to algorithm input parameters. Algorithm parameters optimized for a set of images, do not necessarily produce good-quality segmentation results for other images. Even within an image, some regions may not be well segmented due to a number of factors, including multiple pieces of tissue with distinct characteristics, differences in staining of the tissue, normal versus tumor regions, and tumor heterogeneity. Hence, the evaluation of quality of segmentation results is an important step in image analysis and a desirable process. It is very labor intensive to do quality assessment manually with large image datasets because a whole-slide tissue image may have hundreds of thousands of nuclei for respective analysis and usefulness in performing various proper classification of such tissue samples, which in turn assists with more precise diagnosis and course of treatment by pathologists and/or oncologists.

As image scanning technologies advance, large volumes of whole-slide tissue images will be available for research and clinical use. Efficient approaches for the assessment of quality and robustness of output from computerized image analysis workflows, will become increasingly critical to extracting useful quantitative information from tissue images. The disclosed embodiments demonstrate the feasibility of machine-learning-based semi-automated techniques to assist researchers and algorithm developers in such processes.

Whole-slide tissue specimens have long been used to examine how the disease manifests itself at the subcellular level and modifies tissue morphology. By examining glass tissue slides under high-power microscopes, pathologists evaluate changes in tissue morphology and render diagnosis about a patient's state. Advances in digital pathology imaging have made it feasible to capture high-resolution whole-slide tissue images rapidly. Coupled with decreasing storage and computation costs, digital slides have enabled new opportunities for research. Research groups have developed techniques for quantitative analysis of histopathology images and demonstrated the application of tissue imaging in disease research.

Nucleus/cell detection and segmentation are the common methodologies in tissue image analysis. Over the past decade, researchers have developed a variety of nucleus segmentation methods. Nucleus segmentation pipelines process images to detect the locations of nuclei and extract their boundaries. Once the boundaries of nuclei are determined, imaging features (such as size, intensity, shape, and texture features) can be computed for each segmented nucleus and used in downstream analyses for mining and classification. Achieving accurate and robust segmentation results remains a difficult problem because of image noise, such as image acquisition artifacts, differences in staining, and variability in nuclear morphology within and across tissue specimens. It is not uncommon that a segmentation pipeline optimized for a tissue type will produce bad segmentations in images from other tissue types, and even in different regions of the same image.

Bamford and Lovell proposed a nucleus segmentation method with a confidence measure in segmentation output. Since the confidence measure is related to a specific parameter in the particular segmentation method, this quality control method cannot easily be expanded to other segmentation algorithms. Cukierski et al. assigned a numeric value to each segmented object. Probability is calculated from a logistic regression built on the morphological, texture, and contextual features of the segmented object. By ranking the segmentations based on their probabilities, well-segmented objects were selected. In another recent work, an artificial neural network was trained to classify accurately segmented nuclei and other segmented objects using the shape, intensity, and texture feature of the segmented objects. An experimental evaluation showed that this selection procedure can help increase the precision of segmented objects from 17% to 71.5%. Brinker et al. trained a support vector machine (SVM) classifier with the appearance-based features (area, circularity, and solidity) and shape-based features (intensity variance and entropy) of a segmented object. The trained classifier is then used to differentiate correct and incorrect cell segmentations in the preparation for automatic segmentation correction. The previous work on segmentation quality assessment and improvement has developed methods that work at the object level. These methods aim to assess the correct segmentation of individual objects. This process can become computationally very expensive in high-resolution images with millions of nuclei and may not scale to large datasets.

It is labor intensive to manually check every image and every segmented nucleus in an image. A typical whole-slide tissue image contains a few hundred thousand to over a million nuclei. This data problem is compounded by the fact that datasets with thousands of images are becoming common in image analysis projects with the help of advanced tissue slide scanners and increased storage capacity of modern computing platforms. Semi-automated or automated error checking workflows are desired to help researchers and algorithm developers detect bad segmentation results more quickly, reliably and expediently.

Therefore, it is desirable to implement a quality control system and method in order to assess the quality of segmentation results before the results are used in downstream analyses for knowledge discovery and scientific interpretation.

It is further desirable to implement semi-automated mechanisms and related processes to assist researchers and application developers to detect image regions with bad segmentations efficiently.

It is yet further desirable to implement a system and method that evaluates a machine-learning-based semi-automated workflow to assess quality of nucleus segmentation or other object results in a colossal set of images, such as whole-slide tissue images.

It is further desirable to implement a novel quality control method and related system, in which machine-learning algorithms are trained with image intensity and texture features to produce a tailored classification model. In certain disclosed embodiments this classification model is applied to image patches in a whole-slide tissue image to predict the quality of nucleus segmentation in each patch. The training step of such disclosed quality assessment system and method involves the selection and labeling of regions by a pathologist in a set of images to create the training dataset. The image regions are partitioned into patches. A set of intensity and texture features is then computed for each patch.

In yet further disclosed embodiments, a classifier is then trained with the features and the labels assigned by the pathologist. At the end of this process, a classification model is generated. The classification step applies the classification model to unlabeled test images. Each test image is partitioned into patches. The classification model is then applied to each patch to predict the patch's label.

It is further desirable to implement a novel segmentation quality control system and method that uses patch-level intensity and texture features to evaluate nucleus segmentation results in high-resolution whole-slide tissue images. This approach is motivated by the observation that image regions with similar intensity and texture features tend to have comparable segmentation quality given a segmentation algorithm and a set of segmentation parameter values.

It is yet further desirable to implement a system and method in which segmentation results are used only for labeling image regions in the training phase but not used in the prediction (or classification) phase. Hence, in order to scale millions of nuclei or other objects, and large numbers of images, the disclosed embodiment assesses the segmentation quality of image patches, instead of based on the accuracy of pixel-level boundary delineation or otherwise relying on the probability that an object has been segmented well.

SUMMARY OF THE INVENTION

In accordance with an embodiment or aspect, the present technology is directed to a system and method associated with predicting segmentation quality of segmented objects implemented in the analysis of copious image data. The system comprises a quality assessment engine that includes a computing device.

In accordance with an embodiment or aspect, disclosed is the system and method that includes the computing device perform operations including receiving a collection of image data related to a particular type of data and partitioning the image data into segmented data portions based on an object associated with the collection of image data. The system and method further includes determining regions of interest associated with the segmented data portions and further determining quality of segmentation of the segmented data portions for respective classification of the regions of interest. The system and method further includes assigning a classification label to the regions of interest and partitioning regions of interest into sub-regions. The system and method yet further includes determining features associated with the sub-regions of the segmented data portions. The system and method yet further includes generating a training dataset based on the determined features associated with the sub-regions in order to train a classification model based on a predetermined threshold value. The system and method yet further includes receiving test images to iteratively classify segmented data portions based on an object associated with the test images, using the trained classification model; and predicting the segmentation quality of segmented objects in the test images based on the trained classification model.

In yet a further disclosed embodiment, the system and method further comprises that the features associated with the sub-regions comprise intensity values. The system and method includes additional embodiments which are provided herein below respectively. The system and method further includes that the features associated with the sub-regions further comprise texture features of the objects associated with the segmented data portions. The system and method further includes the features associated with the sub-regions comprise intensity values and texture features of the objects associated with the segmented data portions. The system and method further includes the classification label includes at least one of: bad segmentation, under-segmented, over-segmented and good segmentation of the objects associated with the segmented data portions. The system and method further includes that the regions of interest are segmented into sub-regions of equal-sized areas. The system and method yet further includes adjusting the predetermined threshold value to achieve more refined segmentation quality. The system and method yet further includes the predetermined threshold value comprising a gain value being adjusted in the range of 0.0 and 2.0, in order to adjust respective intensity differences. The system and method yet further includes the objects being one of: a biological object, a cellular object, an artificial structure associated with a map, a natural structure associated with a map, a miscellaneous object located on earth, and a miscellaneous object surrounding the atmosphere above earth.

In accordance with yet another disclosed embodiment, a computer readable device is disclosed storing instructions that, when executed by a processing device, performs various operations. The operations include receiving a collection of image data related to a particular type of data and partitioning the image data into segmented data portions based on an object associated with the collection of image data. Further disclosed operations include determining regions of interest associated with the segmented data portions and further determining quality of segmentation of the segmented data portions for respective classification of the regions of interest. Further disclosed operations include assigning a classification label to the regions of interest and partitioning regions of interest into sub-regions. Yet further disclosed operations include determining features associated with the sub-regions of the segmented data portions. Yet further disclosed operations include generating a training dataset based on the determined features associated with the sub-regions in order to train a classification model based on a predetermined threshold value. Yet further disclosed operations include receiving test images to iteratively classify segmented data portions based on an object associated with the test images, using the trained classification model; and predicting the segmentation quality of segmented objects in the test images based on the trained classification model.

In yet another disclosed embodiment, the computer readable device performs additional operations including that in which the objects are one of: a biological object, a cellular object, an artificial structure associated with a map, a natural structure associated with a map, a miscellaneous object located on earth, and a miscellaneous object surrounding the atmosphere above earth.

These and other purposes, goals and advantages of the present application will become apparent from the following detailed description read in connection with the accompanying drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

Some embodiments or aspects are illustrated by way of example and not limitation in the figures of the accompanying drawings in which:

FIGS. 4A-1 to 4A-2 illustrate portions of a complete flowchart of an exemplary method (when interpreted in unison) of segmentation using a classification model, implemented by the segmentation quality assessment process, in accordance with an embodiment of the disclosed system and method.

FIG. 5 shows micro photographic images of tissue samples providing comparison of segmentation results using different threshold parameters for segmentation, in accordance with an embodiment of the disclosed system and method.

Figure 1:
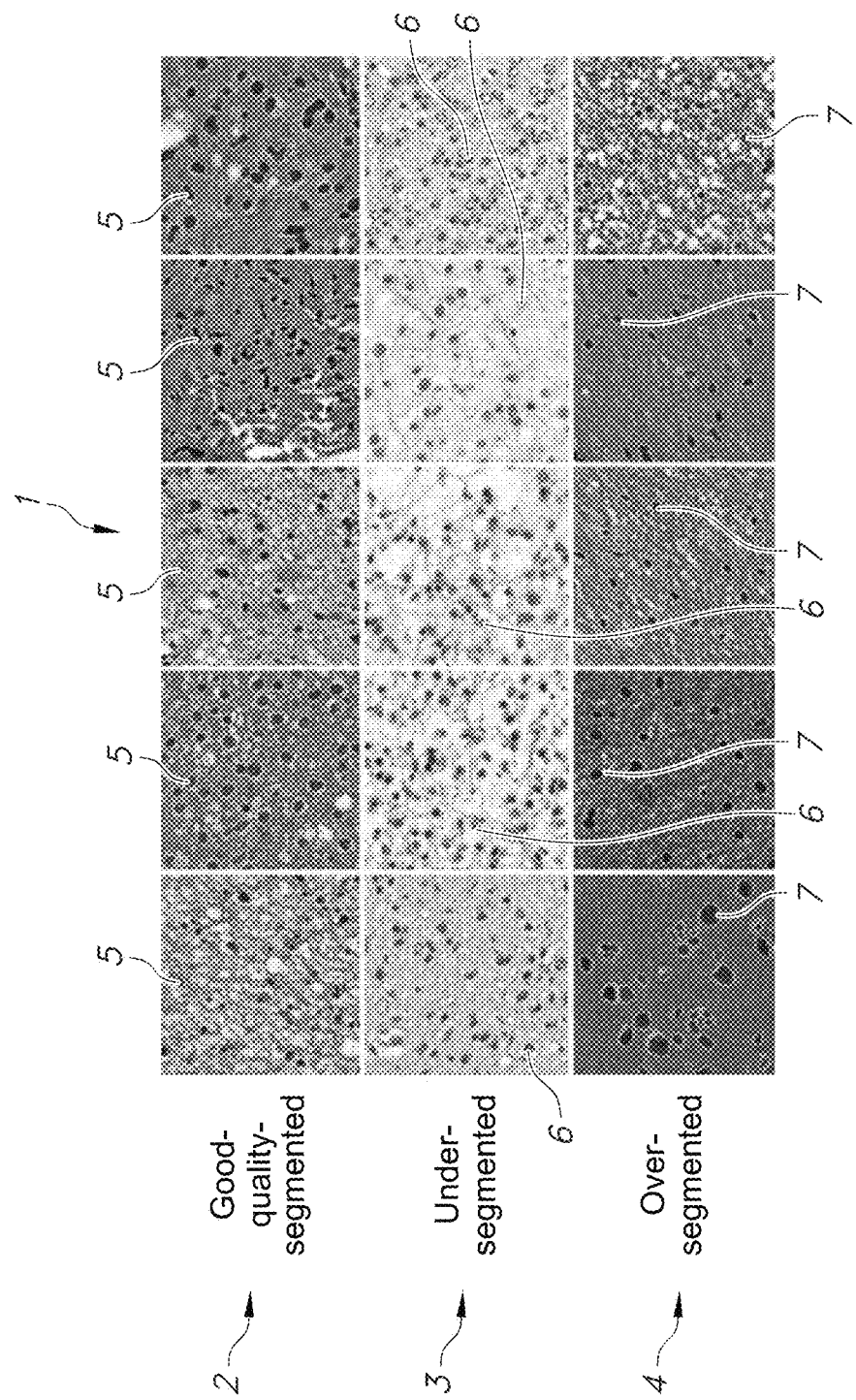
FIG. 1 shows a microphotograph of sample patches with good-segmentation results (good-quality-segmentation) and sample patches with two categories of bad segmentations (under-segmented and over-segmented) resulting from implementation of the same segmentation algorithm, in accordance with an embodiment of the disclosed system and method.

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

The present disclosure relates to a system and method associated with predicting segmentation quality of objects used in analysis of copious image data, including image data at a sub-region of interest level, for example at the patch level. Even more particularly, the present invention relates to a system and method for implementation of a novel system and method that trains a classification model in order to predict the respective labeling of segmentation results and accordingly modify the segmentation process (for example, parameters used by a segmentation algorithm) in order to improve and refine segmentation of objects used in analysis of copious image data.

It is noted that with the recent advances in digital histopathology image analysis, numerous detection classification and segmentation methods for nuclei and other micro-anatomic features and structures have been developed. Reliability and performance of micro-anatomic structure detection, classification and segmentation methods vary from specimen to specimen with method performance depending on many factors including tissue preparation, staining and imaging. A robust error assessment stage can play a vital role in assessing quality of micro-anatomic structure detection, classification and segmentation and in enabling a whole slide image analysis quality control process.

More particularly disclosed is a quality assessment system and method directed to predicting segmentation quality of objects associated with prodigious image data at the patch level (for example, a patch is a sub-area of a region of interest in a tissue image slide or other image data), and performs well across a range of images including various types of objects. It is noted that the texture appearance for different object types generally may vary, for example, cancer types, or a particular object such information retrieved from real-time GPS navigation, including traffic, transit, and/or other details about any place or structure retrieved from Google Maps® such as building(s), natural structures, land formations, objects in the earth's atmosphere, etc. Such texture and/or appearance characteristics may vary significantly, such that different texture features would be selected for the classification model and the training phase that would result in training a different classification model.

In certain disclosed embodiments, while the model trained during the implementation of the quality assessment system and method, cannot necessarily be directly applied to other object types, for example, certain cancer types, the disclosed embodiment can be generalized to other cancer types by training new classification models for other cancer types or other object types (for example, building structures). In certain disclosed embodiments, the model that is trained to predict segmentation quality, and can be generalized or learned to apply to other object types as well, such as other types of buildings (homes vs. high rises buildings; nuclear missiles verses other types missiles) by comparing the results of applying the disclosed process on two different types. For example, when applied to certain cancer types and their respective cell nuclei, the disclosed quality assessment system and method performs better when applied to the images with less heterogeneity of nuclei appearance and more consistent texture characteristics. The disclosed quality assessment system and method is also implemented in segmentation methods that make use of the texture characteristics of tissue to detect and delineate nuclear boundaries.

The disclosed quality assessment system and method is directed to a quality control implementation that uses patch-level intensity and texture features to evaluate nucleus segmentation results in high-resolution whole-slide tissue images. The disclosed embodiment is motivated by the observation that image regions with similar intensity and texture features tend to have comparable segmentation quality given a segmentation algorithm and a set of segmentation parameter values. Segmentation results are used only for labeling image regions in the training phase but not used in the prediction (or classification) phase. In order to scale millions of nuclei and large numbers of images, the disclosed embodiment assesses the segmentation quality of image patches, instead of the accuracy of pixel-level boundary delineation or the probability that an object has been segmented well.

In order to further illustrate various levels of quality in the segmentation of image patches, FIG. 1 shows micro photographs of sample segmentation patches 1 of WHO Grade II lower grade glioma for each of the three indicated categories: (1) good-quality segmentation; (2) under-segmented; and (3) over-segmented. Shown in FIG. 1 are patches 5 in the top row 2 with good-segmentation results 2 (good-quality-segmentation); and sample patches with two categories of bad segmentations (under-segmented patches 6 as shown in the middle row 3, and over-segmented patches 7 as shown in the bottom row 4) which each resulting from the implementation of the same example segmentation algorithm. In the example embodiment, the "under-segmented" patches 6 in FIG. 1 refer to the cases, in which some nuclei were missed due to poor contrast between the nuclei and the tissue. The "over-segmented" patches 7, on the other hand, have non-nuclear material segmented as nuclei or sets of single nuclei segmented as multiple nuclei.

The quality assessment system and method is based on the premise observed that image regions with similar intensity and texture features tend to have comparable segmentation quality given a segmentation algorithm and a set of segmentation parameter values. In an example embodiment of the quality control implementation, segmentation results are used only for labelling image regions in the training phase but not used in the prediction (or classification) phase. In order to scale millions of nuclei and large numbers of images, the example embodiment assesses the segmentation quality of image patches, instead of the accuracy of pixel-level boundary delineation or the probability that an object has been segmented well. The example quality assessment system and method is executed with segmentation results obtained from a collection of whole-slide tissue images.

During the training phase, a sample image set is randomly selected by a pathologist from the collection of images. The pathologist examines the segmentation results in the sample images and selects representative regions of interest (ROI) in each sample image. The process then classifies the regions with good-segmentation results as good-quality segmentation; and regions with bad-segmentation results as under-segmented or over-segmented. The selected regions are partitioned into equal-sized image areas (for example, sub-regions of interest or patches), and a set of intensity and texture features is computed for each respective patch.

A machine-learning model is then trained using the features and labels of each patch in the training set. In the classification phase, test images are partitioned into patches (of the same size as the patches or sub-regions in the training set), the same set of intensity and texture features is computed, and each patch is classified using the features and the trained model. The classification model must be retrained for results obtained from a different segmentation algorithm or a different set of algorithm parameter values. In such case, the training phase will use the same set of intensity and texture features, but the set of patches and their labels may be different. The utilization of segmentation results and morphological features (such as size and shape of a segmented nucleus) in the training and classification phases will also be indicative and important to retraining the results during the training phase.

An example embodiment of the disclosed quality assessment system and method was used for segmentation of images associated with two different cancer types: WHO Grade II lower grade gliomas (LGGs) and lung adenocarcinoma (LUAD) cases from The Cancer Genome Atlas (TCGA) project. It was determined that for each of the cancer types, segmented images were accomplished using a segmentation algorithm which discriminates between background tissue and target nuclei through a threshold parameter. Threshold parameters are used in many nucleus segmentation algorithms to delineate the boundaries of target objects. However, the choice of certain threshold parameter values in segmentation algorithms leads to under-segmentation or over-segmentation of an image. The example embodiment of the quality assessment system and method not only can predict the segmentation quality based on the image information, but also can provide suggestions as to which direction the threshold value of the segmentation algorithm should be adjusted to obtain even better segmentation results.

The disclosed system and method permits respective adjustment of the input parameters of the segmentation algorithm for regions in order to get more refined and accurate segmentation results. For example, if the segmentation algorithm uses a threshold parameter to adjust its sensitivity to intensity differences, the disclosed embodiment permits an additional step to lower the threshold value for under-segmented regions and also to increase the threshold value for over-segmented regions. The threshold parameter is specific to the segmentation algorithm and used in the evaluation and validation of the disclosed quality assessment system and method. The disclosed system and method includes the capability to classify "over-segmentation" and "under-segmentation" and to provide guidance to the user and/or developer of the segmentation algorithm so that the appropriate parameters of the segmentation algorithm can be adjusted to correct respective under-segmentation or over-segmentation. The quality assessment system and method can function independently of the specific parameters of a given segmentation algorithm and yet can be configured to adjust such specific parameters in order to improve segmentation quality.

In another contemplated embodiment, the disclosed system and method permits the adjustment of the input parameters of the segmentation algorithm for those regions to generate more refined and accurate segmentation results. For example, if the segmentation algorithm implements a threshold parameter to adjust its sensitivity to intensity differences, an additional step is implemented that lowers the threshold value for under-segmented regions and increases it for over-segmented regions.

In yet another contemplated embodiment, a further step allows for the adjustment of the input parameters of a segmentation algorithm for those regions to get more refined and accurate segmentation results. For example, if a segmentation algorithm uses a gain parameter, the value of which ranges between 0.0 and 2.0, to adjust its sensitivity to intensity differences, the additional step increases the gain value for under-segmented regions and decreases it for over-segmented regions. Assume a user runs the segmentation algorithm with the gain parameter set to 0.7. The user evaluates the segmentation results using the disclosed system and method. This evaluation generates a classification of image regions into good segmentation, under-segmentation, over-segmentation, and bad segmentation. The user can then increase the value of the gain parameter (for instance, to 0.9) for the under-segmented regions and run the segmentation algorithm for those regions. Similarly the user can decrease the value of the gain parameter (for instance, to 0.5) for the over-segmented regions and run the segmentation algorithm for those regions.

Figure 4:
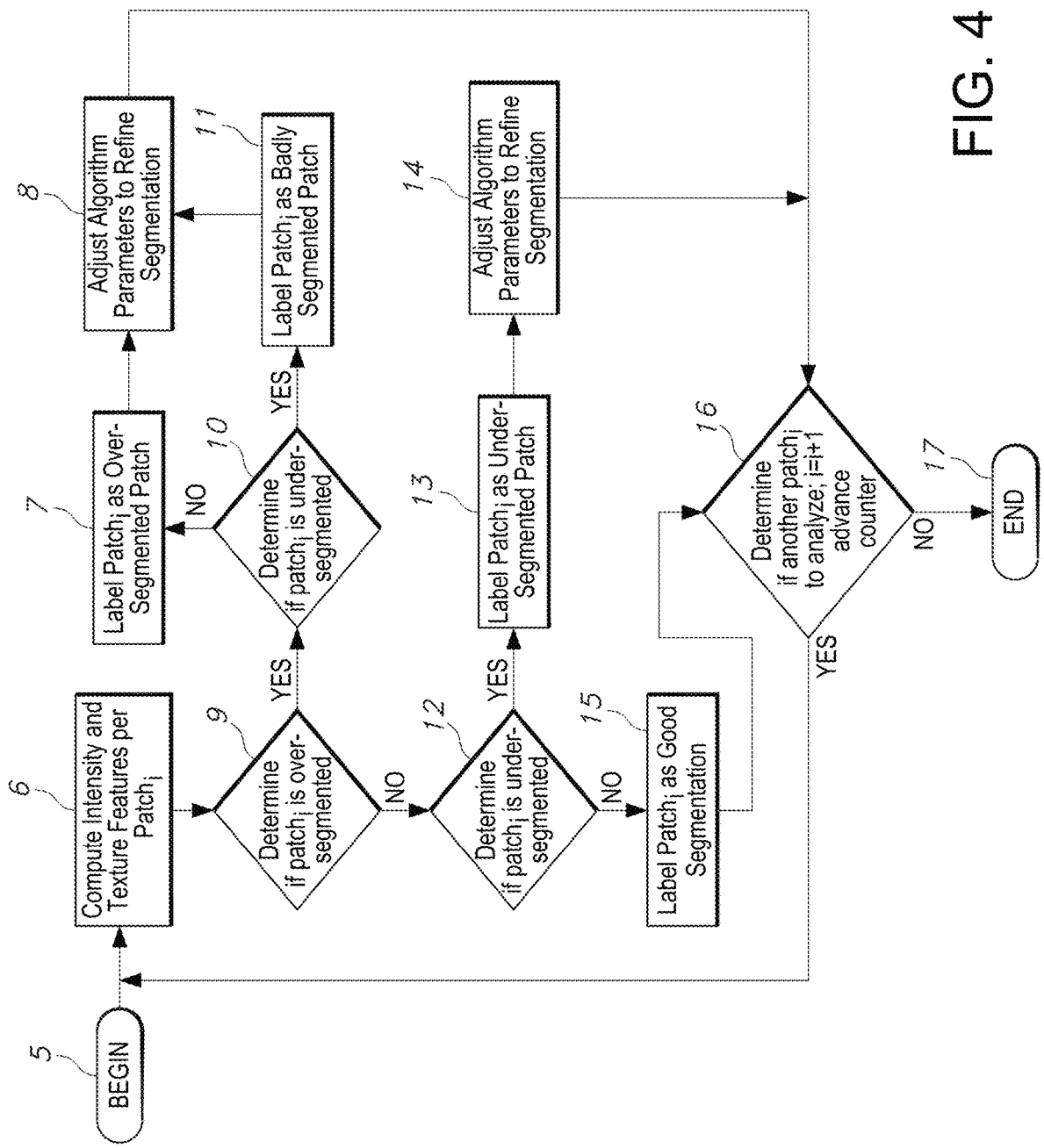
FIG. 4 illustrates a flowchart of an exemplary method of classification implemented by the segmentation quality assessment process, specifically training classification model(s) and refining segmentation, in accordance with an embodiment of the disclosed system and method.
Figures 1, 4A:
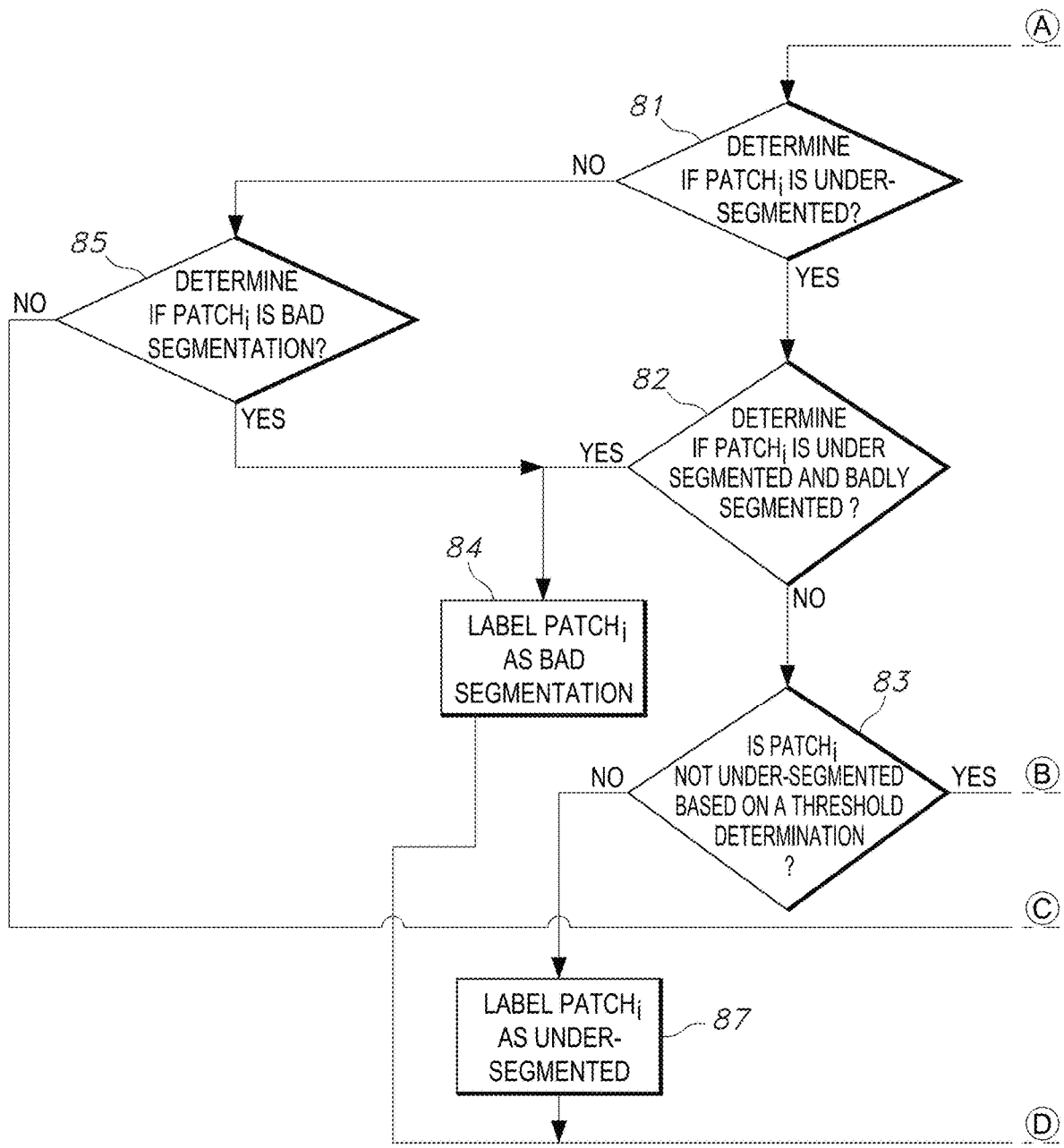
Figures 2, 4A:
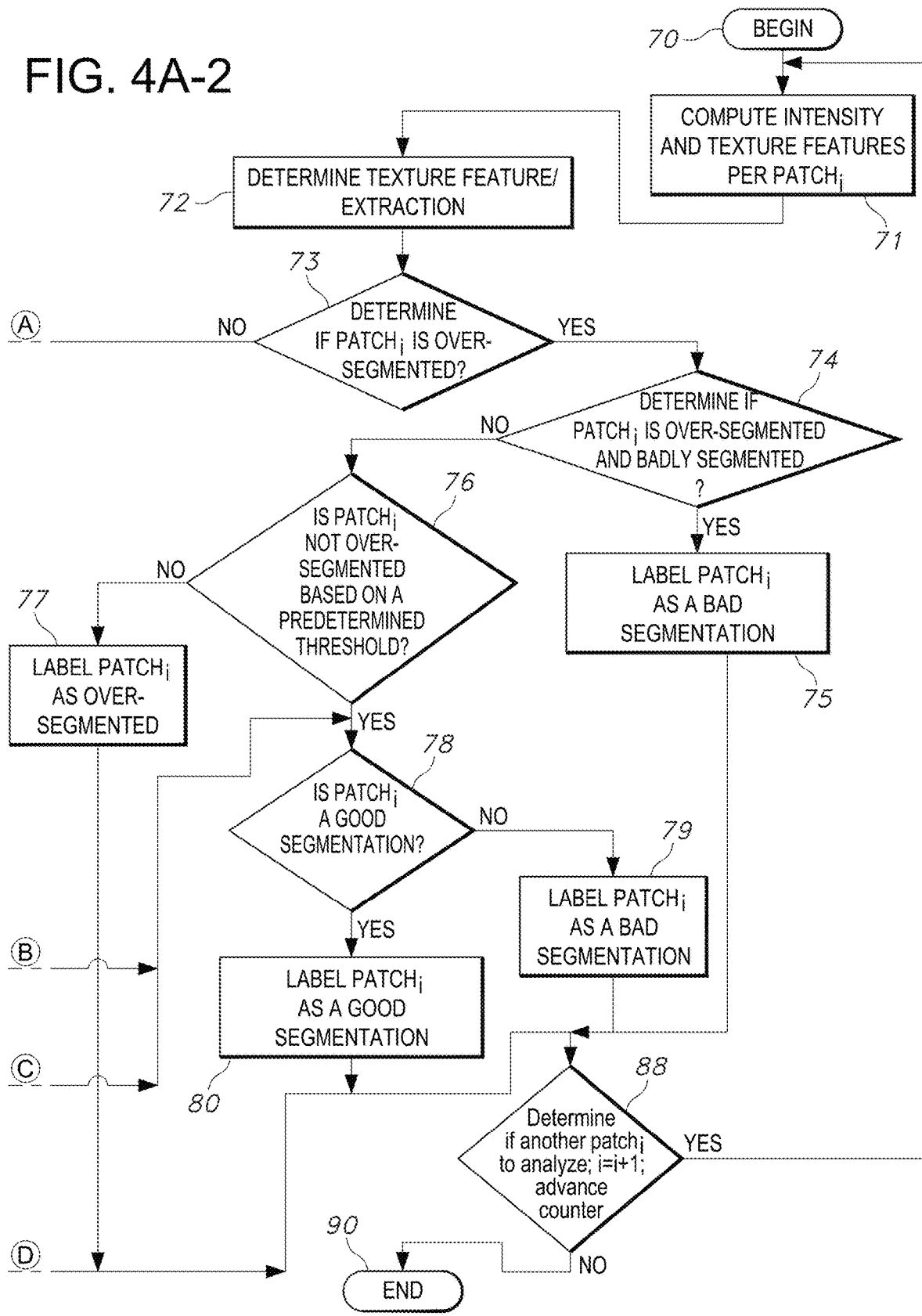
Figure 4B:
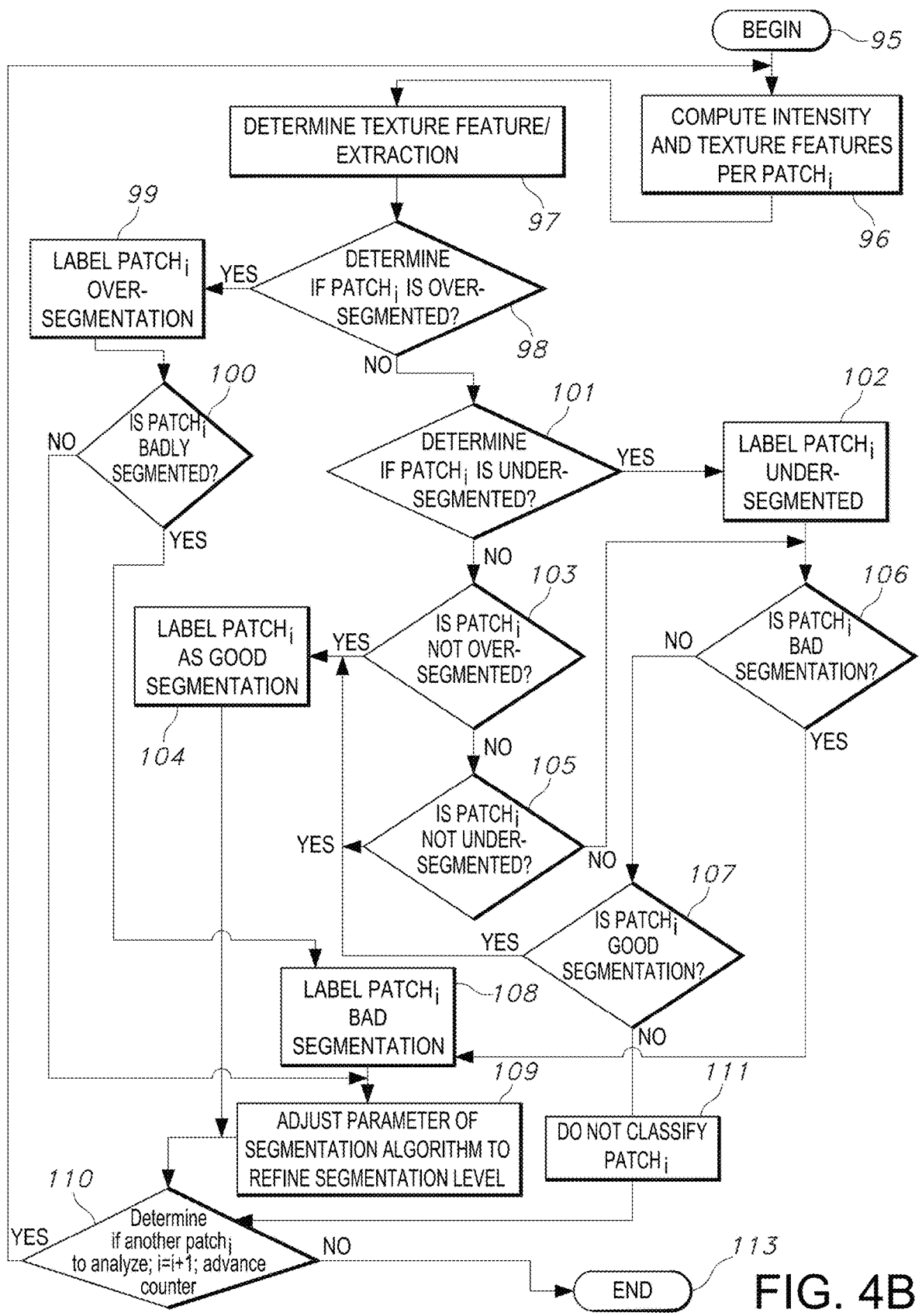
FIG. 4B illustrates a flowchart of an exemplary method of classification and training a segmentation algorithm as implemented by the segmentation quality assessment process, in accordance with an embodiment of the disclosed system and method.

As described in further detail herein below with respect to FIGS. 4-4B, are example implementations of training the segmentation algorithm to predict if a patch is under-segmented or over-segmented, which is used to guide the selection of algorithm parameters including adjusting threshold values of the segmentation algorithm to actually improve segmentation results and the prediction of quality of segmentation.

Figure 2:
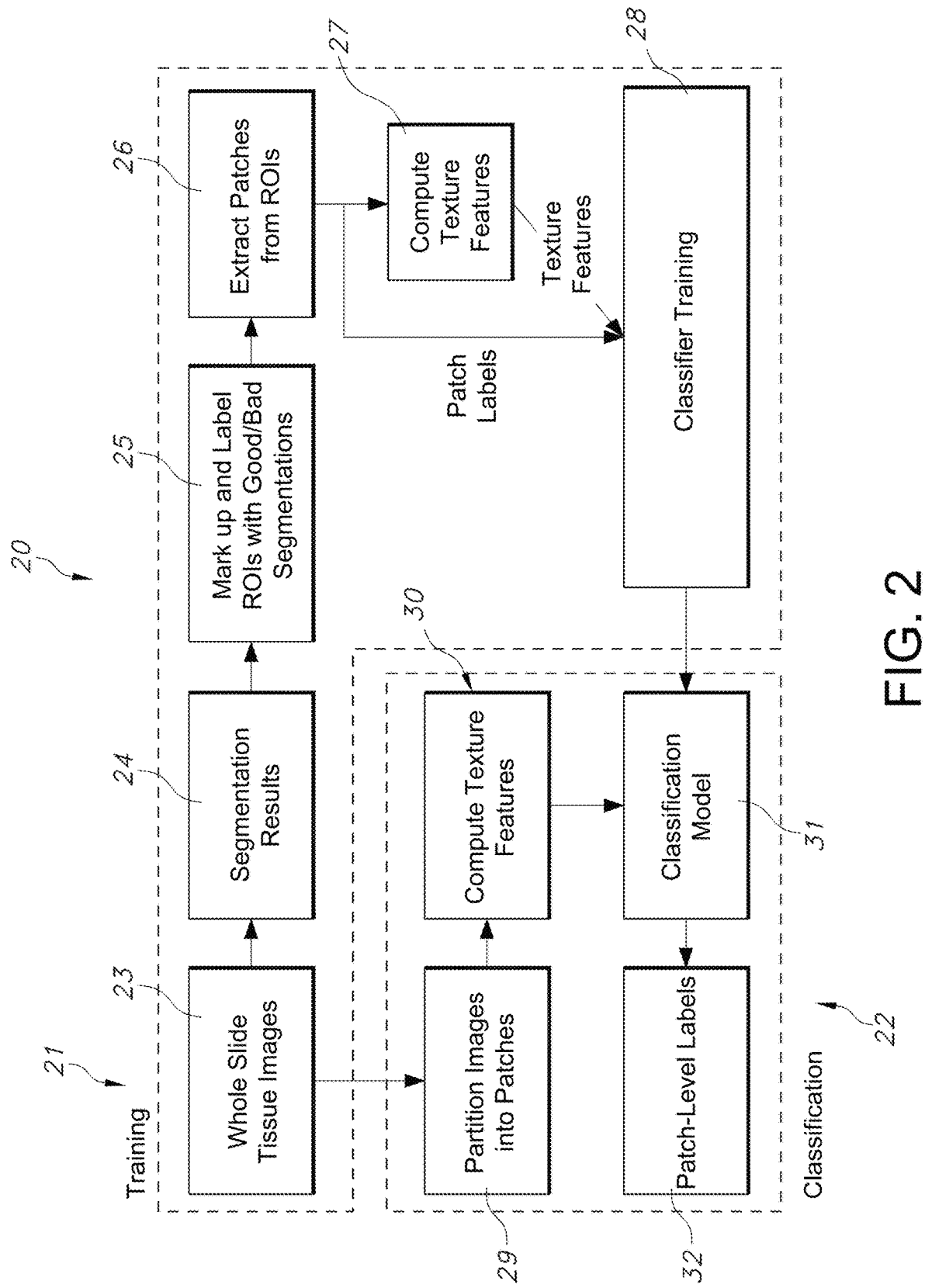
FIG. 2 provides an overview of the workflow of the segmentation quality assessment process, in accordance with an embodiment of the disclosed system and method.

Further described herein below with respect to FIG. 2, is an overview of the segmentation quality assessment pipeline, including generation of labelled sample patches, patch-level texture feature extraction, and classification. An example implementation of the quality assessment system and method is also presented in greater detail herein below in FIG. 3A.

The methods disclosed herein employ machine learning for quality assessment. This example machine learning for quality assessment method includes three steps. The method is described using the example of nuclear segmentation but the method could be used to assess quality of detection and segmentation or any other micro-anatomic object, e.g. gland, duct, nucleolus, mitotic figure or lymphocyte. The approach could also be used for example, in immunohistochemistry to identify stained cancer cell nuclear membranes or to identify a particular type of cell. An overview of the three main steps of the disclosed system and method are illustrated in FIG. 2.

The first step creates a training dataset 21. The process begins with an image dataset 23 in which images have been processed by a micro-anatomic structure detection and segmentation method generating segmentation results 24. Next the system selects a subset of the images and labels regions in these images 25. A region label indicates whether detection and segmentation results in said region are good quality or not. In the case of nuclear segmentation, the label that indicates bad quality segmentation assesses whether nuclei are "under" or "over" segmented, i.e., whether a segmentation algorithm has a tendency to misclassify non-nuclear material as nuclear material or alternately misclassify nuclear material as non-nuclear material. Regions labeled by the experts are partitioned into disjoint rectangular image patches of the same size. Each image patch is assigned the same label of the region from which the patch is extracted. A set of features are computed by the system for each patch in step 27. These features may include texture and intensity features computed for the entire patch as well as features computed for segmented objects in the patch.

The second step 28 trains a classifier to create a classification model 31. The patches and features extracted in the first step are used as the training dataset to train a classifier by using the patch labels as ground truth classification. A variety of machine learning methods can be implemented including Random Forest, SVM and Neural Networks. In the case of nuclear segmentation, the resulting classification model includes two sub-models. This first sub-model classifies if nuclei in a patch are under-segmented or not. The second sub-model classifies if nuclei in a patch are over-segmented or not. These two models are used in combination in the third step to classify a new patch.

The third step 22 applies the classification model 31 to new whole slide tissue images to assess the quality of detection and segmentation results. Each input image is partitioned 29 into disjoint rectangular patches of the same size, as in the first step. The same set of features is computed for each patch in step 30. A patch is classified by the two sub-models. If one sub-model classifies the patch as not under-segmented and the second sub-model classifies the same patch as not over-segmented, the patch is classified as containing good quality results (good segmented). If the first sub-model classifies the patch as under-segmented and the second model as not over-segmented, the patch is classified as containing under-segmented results. If the first model classifies the patch as not under-segmented and the second model as over-segmented, the patch is classified as containing over-segmented results. If the first model classifies the patch as under-segmented and the second model as over-segmented, the patch is classified as containing bad segmentation results. The third step is further illustrated in FIG. 3B. The results of the quality assessment process can be represented as a heat map and over-laying on a whole slide image. This overlay can be used to guide segmentation algorithm selection, in identifying well-segmented regions of interest or in a segmentation algorithm i.e. computational steering. A prototype may be constructed to demonstrate this example method using for example, Random Forest and SVM machine learning methods.

Figure 3A:
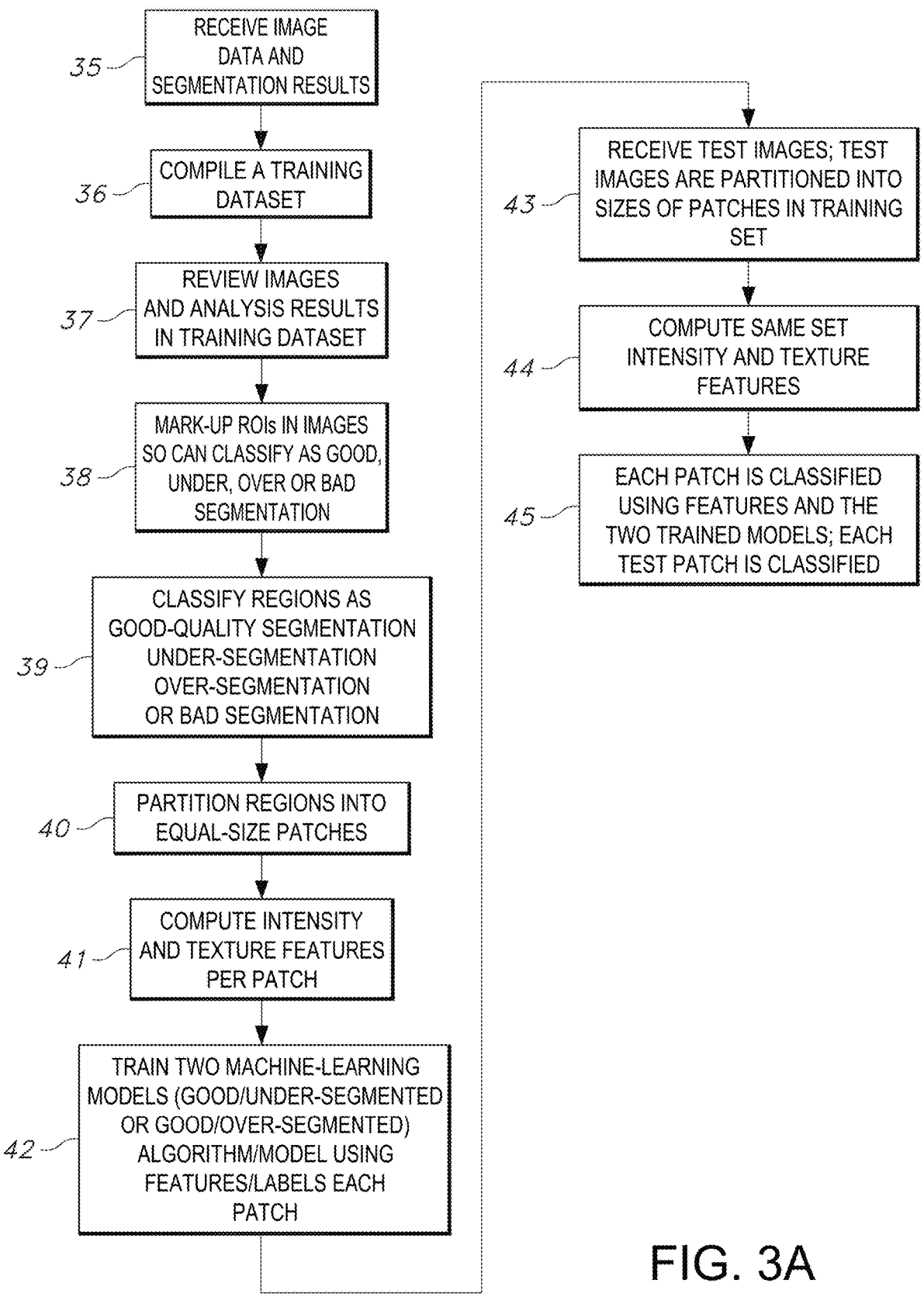
FIG. 3A illustrates a flowchart of an exemplary method of the segmentation quality control process that trains a machine-learning algorithm using features/labels in subject patches and classifies each path, in accordance with an embodiment of the disclosed system and method.
Figure 3B:
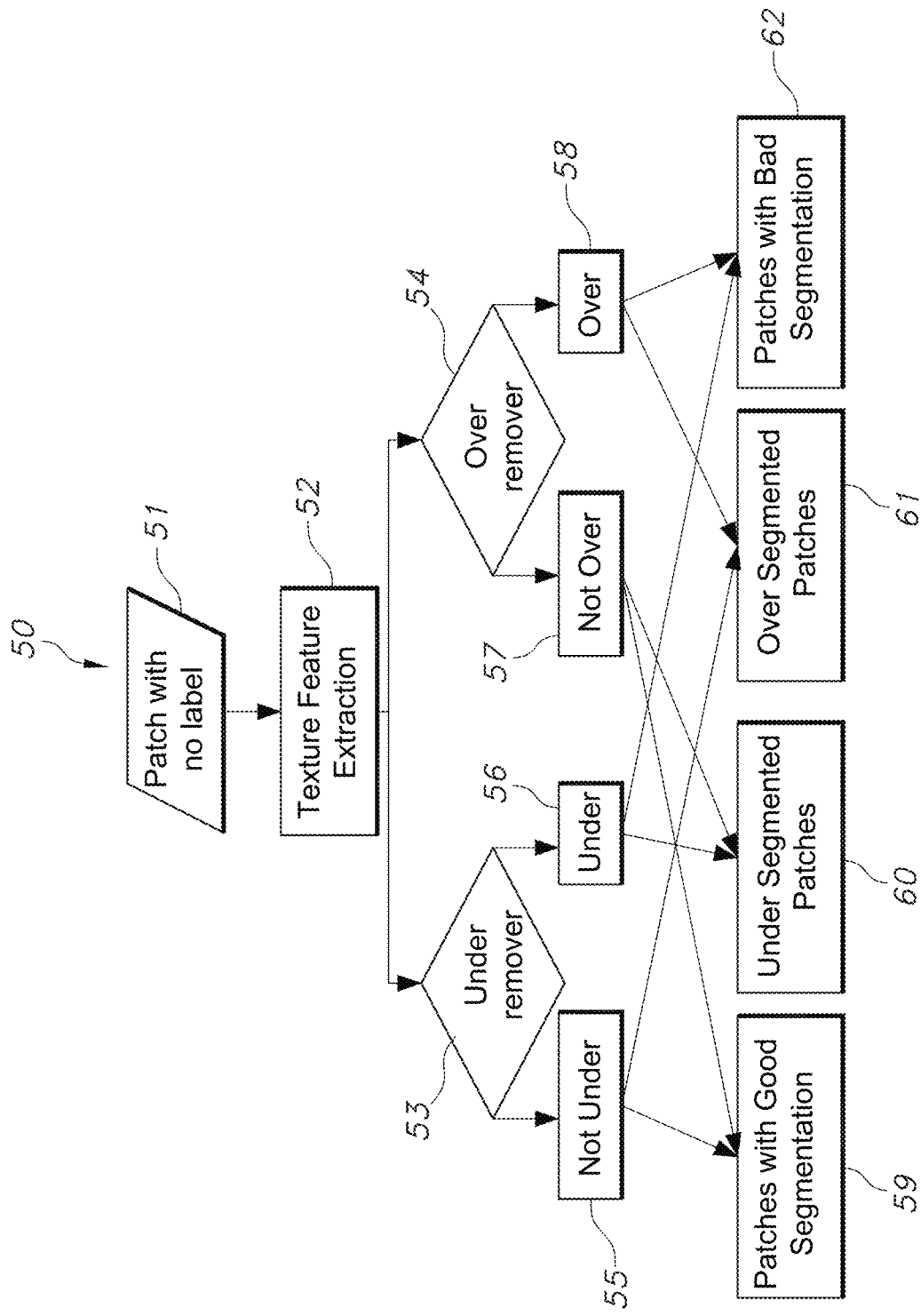
FIG. 3B illustrates a flowchart of an exemplary method of classification and the framework of the decision-making strategy for patches with no labels, as implemented by the segmentation quality assessment process, in accordance with an embodiment of the disclosed system and method.

An example application of the workflows shown in FIGS. 2 and 3B, was demonstrated by assessing segmentation quality of a particular segmentation method applied to two datasets, WHO grade II Lower Grade Glioma (LGG) and Lung Adenocarcinoma (LUAD). The results showed that our method perforated well to detect good-segmented areas (with F-score 84.7% for LGG and 75.43% for LUAD) at patch level.

Referring back to FIG. 2 with greater particularity, is an example implementation of the workflow associated with nucleus or other object segmentation quality assessment pipeline 20, in accordance with an example embodiment of the disclosed quality assessment system and method. The example embodiment consists of sub-processes that include training 21 and classification 22, as shown in FIG. 2. During the training phase 21, whole slide tissue images are received in step 23. The objects in such images are next segmented using for example, a nucleus segmentation algorithm, in step 24. The image regions in a sample set of images are selected and labelled by a pathologist to create the training set in step 25. The regions of interest are labelled for example, as good or bad segmentations in step 25. Next, the image regions of interest are then partitioned into image patches, and a set of intensity and texture features 27 are computed for each patch. The next step in this training phase 21 is classifier training 28 using the labels of the image regions and the computed features 27. Next, during the classification step 22, the classification model 31 is applied to the test data to assess the quality of segmentations in image patches extracted from images in the test dataset. Now that the classification model 31 is trained, whole slide tissues images are received in step 23. The images are partitioned into patches (or sub-regions of interest or sub-areas) in step 29. Next texture features are computed in step 30. The classification model 31 is applied to the data to assess the quality of segmentations. The respective labels are next applied to the respective patches in step 32.

In particular, during the training phase 21, a subset result of whole-slide tissue images 23 that are segmented during step 24 in the target dataset is randomly chosen. The pathologist and/or system marks-up regions in each selected image and assigns a classification label to each respective region in step 25. There are three classification labels in the example embodiment that are used to label a region: 1) label a region with good-segmentation results (good-quality-segmentation); 2) label a region with under-segmented nuclei (under-segmented); or 3) label a region with over-segmentation (over-segmented). If a region is labelled under-segmented, it means that the segmentation algorithm has missed some nuclei in the region and/or segmented single nuclei as multiple nuclei. If a region is labelled as over-segmented, it means that the segmentation algorithm has segmented more objects than there are actual nuclei.

In accordance with an example embodiment, disclosed is a stratified sampling method that is used to select a subset of images for the training set. If the images belong to some natural strata, images are randomly selected from each group based on the number of images in each group. Images are grouped, based on their respective tissue source site which is represented as i (i=1, . . . n). The tissue source site indicates from which institution and/or the integrity of the particular tissue sample that was obtained. Grouping images based on the tissue source site is performed to accommodate for variability in images due to differences in tissue preparation and image acquisition across source sites. In order to select N images for the training set, the system computes (using a processing device or similar computing device), the ratio $p_i$ ($\Sigma p_i=1$) of images from each site i to the total number of images. The relative size of the sample images from site i would be represented as $N \times p_i$. In order to ensure that the respective training set has images from all the source sites, one image is selected randomly from the sites with $N \times p_i \leq 1$.

In the remaining sites, that are represented as $i \in \{i | N \times p_i \geq 1\}$, the system re-computes the ratio represented as shown in equation below:

$$p'_i = \frac{p_i}{\sum_{\{i | N \times p_i > 1\}} p_i}$$

The system next randomly selects images defined in equation shown below:

$(N-\Sigma 1_{\{i|N \times p_i \leq 1\}}) \times p'_i$ images from those source sites.

The equation defined as $\Sigma 1_{\{i|N \times p_i \leq 1\}}$ indicates the number of source sites from which only one image has been selected.

In a further embodiment, image regions that are selected by the pathologist and/or system, can be of any shape and size. Each region is partitioned into non-overlapping patches of the same size and shape. The number of patches in each region will depend on the region's shape and size. All of the patches in a region are assigned the same label as that of the region. Two sets of intensity and texture features are calculated for each region. It is noted that in certain embodiments, the sets of intensity and texture features are computed at the patch level, rather than computed for nuclei segmented in the patch. The first set contains 16 features from three groups (for example, pixel statistics, gradient statistics, and edge). A total of 32 features are computed from this set, for example: 16 for the red channel and 16 for the blue channel. These features are listed as shown below in Table 1. The second set of features consists of the mean and standard deviation of the intensity values of the red, green, and blue channels.

Table 1: provides list of patch level texture features for red and blue channel.

TABLE 1

Table 1: List of the patch level texture features for red and blue channel

| Category | Name | Brief description |
| --- | --- | --- |
| Pixel statistics | IntensityMean | Average of raw pixel value |
| | IntensityMax | Maximum of raw pixel value |
| | IntensityMax | Minimum of raw pixel value |
| | IntensityStd | SD of raw pixel value |
| | IntensityEntropy | Entropy of the normalized co-occurrence matrix of pixel value |
| | IntensityEnergy | Sum of squared elements in the normalized co-occurrence matrix of pixel value |
| | IntensitySkewness | Skewness of the normalized pixel value |
| | IntensityKurtosis | Kurtosis of the normalized pixel value |
| Gradient statistics | GradientMean | Average of gradient channel value |
| | GradientStd | SD of gradient channel value |
| | GradientEntropy | Entropy of the normalized co-occurence matrix of gradient channel value |
| | GradientEnergy | Sum of squared elements in the normalized co-occurrence matrix of gradient gradient channel value |
| | GradientSkewness | Skewness of the normalized gradient channel value |
| | GradientKurtosis | Kurtosis of the normalized gradient channel value |
| Edge | CannyNonZero | Number of pixel with nonzero canny value |
| | CannyMean | Average of canny value |

SD: Standard deviation

In order to avoid collinearity among the features and to select the more informative features, stepwise variable selection in logistic regression is applied. Such variable selection is an essential pre-procedure and has many benefits for classifiers, such as reducing the measurement requirements, reducing training and utilizing times, and alleviating the problems associated with dimensionality to improve prediction performance. Stepwise variable selection in logistic regression is one of the commonly used variable selection methods.

In certain disclosed embodiments, two sets are created for the variable selection process. One set contains the patches that have good segmentation results and the patches that are under-segmented. The other set is composed of the patches that have good-segmentation results and the patches that are over-segmented. The variable selection process is applied to the two sets independently. The label of each patch is treated as a binary response variable. The computed features are added to or removed from the feature set at each iterative step to achieve a smaller Bayesian information criterion until no more action can be performed by the system to reduce the criterion. In this way, the selected features are the smallest subset of the input features with sufficient information to differentiate the two categories (good vs. under-segmented or good vs. over-segmented). Turning to a different set of sample patches, the selected features are different based on their distinct texture characters. The system in certain embodiments, implements stepwise selection for a generalized linear regression model using for example, Statistics and Machine Learning Toolbox™ in MATLAB to carry out the variable selection step.

Classification Models: The features selected for good versus under-segmented may not be able to differentiate over-segmented patches from patches with good-segmentation results, and similarly, the features for good versus over-segmented may not be able to separate under-segmented patches from patches with good-segmentation results. Therefore, in the disclosed preferred embodiment, the system trains two classification models. One classification model is trained using the set of patches with good-segmentation results and under-segmented patches. The second classification model is trained using the set of patches with good-segmentation results and over-segmented patches. These two classification models are applied to a test patch to predict the label of the test patch as well as train the segmentation algorithm, as described in greater detail herein below with respect to at least FIGS. 3A-4B.

Test Phase: In certain disclosed embodiments, when a new patch with no labels goes through the classification process, the system will generate two labels, one from each classification model. One label indicates whether the patch is under-segmented or not-under-segmented. The other label classifies whether the patch is over-segmented or not-over-segmented. The two classification results are combined to make a final decision about the segmentation quality of the patch.

An overview of the process of quality control of an embodiment of the process of segmentation and classification of objects is shown in the example method of FIG. 3A. In the first step 35, the quality control system receives image data and segmentation results for respective image data. A single set of results is generally received for each image. During the training phase (steps 35-42) of the disclosed quality control process, the image regions in a sample set of images are selected and labeled by a pathologist to create the training set. The pathologist for example, can analyze the segmented images using QuIP application and label regions good-quality-segmentations, under-segmented, and over-segmented in each image in the training set. For example, QuIP is a web-based suite of tools and services that are designed to support analysis, management, and query of pathology image data and image analysis results. QuIP provides web applications and interfaces for users to interact with and visualize images and analysis results. The web interfaces and applications are backed by a database, which indexes metadata about whole-slide tissue images and results from segmentation and feature computation pipelines. Users can view high-resolution whole-slide tissue images and segmentation results using for example, the caMicroscope application. A user can request an image and select analysis results from an analysis algorithm and view the analysis results overlaid on the image as polygons. The user can pan and zoom in the image, mark-up regions using rectangular or freehand drawing tools, annotate the regions with a label, and save the results in the database.

During the training phase of the disclosed quality control process, the system as shown in FIG. 3A, next compiles a training dataset in step 36. The system in step 37 proceeds to analyze images and perform the analysis of results the training data set generated in step 36. The system proceeds to determine regions of interest (ROI) in the data set in step 38. The respective regions of interest are marked-up or delineated in the images so they can be accordingly classified as either good segmentation, under-segmented, over-segmented or bad segmentation in step 38. Representative regions of interest are analyzed by the system in step 39. A classification label is applied to each region in step 39 as either good-quality segmentation, region with under-segmentation (under-segmented) and region with over-segmentation (over-segmented). A region may also be labeled as bad segmentation. If a region is labeled under-segmented, it means that the segmentation algorithm has missed some objects, for example, nuclei in the region and/or erroneously segmented single objects as multiple objections for example, single nuclei as multiple nuclei. If a region is labeled as over-segmented, it generally refers to the segmentation algorithm having segmented more objects than there are actual objects, for example, nuclei. Next in step 40, the system partitions the respective ROI into equal-sized patches. The intensity and texture features per patch are computed by the system in step 41.

As an example shown in Table 1, is a list of patch level texture features depending on whether being received from the red or blue of a digital camera channel. Table 1 lists various pixel statistics, gradient statistics and edge quality categories. Generally, two sets of intensity and texture features are calculated for each region—in which the features are computed at the patch level, not for nuclei segmented in the patch. Image regions selected by the pathologist can be of any shape and size. Each region is partitioned into non-overlapping patches of the same size and shape. The number of patches in each region will depend on the region's shape and size. All of the patches in a region are assigned the same label as that of the region. Two sets of intensity and texture features are calculated for each region—note that the features are computed at the patch level, not for nuclei segmented in the patch. The first set contains 16 features from three groups (pixel statistics, gradient statistics, and edge). A total of 32 features are computed from this set; 16 for the red channel and 16 for the blue channel as shown in Table 1. The second set of features consists of the mean and standard deviation of the intensity values of the red, green, and blue channels.

Proceeding next to step 43 in FIG. 3A, the system has now progressed in the machine-learning algorithm process that it is able to train a machine-learning algorithm model using features/labels that are now indicated for each patch. Steps 43-45 delineate the prediction phase of the disclosed method of FIG. 3A during which the patches can be classified using the trained models. In step 43 the system receives test images. The test images are also partitioned into same size(s) of patches used in the training set. During step 44, the system next computes the same set intensity and texture features. Next, in step 45, the system can classify and test images partitioned into patches of same size as the training set that is now formed. The system can now compute same set of intensity and texture features in step 44 as learned by the system. Each test patch is classified using features and the two trained models in step 45. The process of using the two trained models to test each patch and classify each test patch is described herein below with respect to various embodiments as illustrated in FIGS. 3B-4B.

In particular, in certain disclosed embodiments, the disclosed quality assessment system and method trains two classification models. One model is trained using the set of patches with good-segmentation results and under-segmented patches. The second model is trained using the set of patches with good-segmentation results and over-segmented patches. These two models are applied to a test patch to predict the test patch's label as further described herein below for example, in FIGS. 3B-4B.

An example embodiment of this process is illustrated in the flowchart shown in FIG. 3B. In FIG. 3B, the system receives a patch with no label in step 51. The system next performs texture feature extraction in step 52, using for example the process described with respect to FIG. 3A. In FIG. 3B, one of the system models acts as an "under remover" 53 (which can be implemented by a processing device such as a segmentation processing device or a module) which essentially labels a patch as under-segmented 56 or not-under-segmented 55. The other model is the "over remover" 54 (which can also be implemented by a processing device such as a segmentation processing device or a segmentation module) which essentially labels a patch as over-segmented 58 or not-over-segmented 57. If the under remover 53 labels a patch under-segmented 56 and the over remover 54 labels the patch not-over-segmented 57, the final label of the patch will be deemed under-segmented 60. This decision is based on the expectation that the over remover 54 will not be able to differentiate between a patch with good-segmentation results and an under-segmented patch, and that the under remover 53 will be more accurate with under-segmented patches.

Similarly, if the over remover 54 labels a patch over-segmented 58 and the under remover 53 labels the patch not-under-segmented, the final label of the patch will be over-segmented 61. If the over remover 54 and the under remover 53 label a patch not-over-segmented 57 and not-under-segmented 55, respectively, the final label of the patch is selected by the system as a patch with good-segmentation results 59. If the over remover 54 labels a patch over-segmented 58 and the under remover 53 labels the patch under-segmented 56, the system concludes that the patch has bad-segmentation results 62. However, in certain embodiments, the system is unable to determine whether the patch is under-segmented 60 or over-segmented 61. In certain cases, there exist anomalies in which the system is unable to detect if the under-segmentation is due to lack of respective objects in the ROI and/or the system was unable to detect due to size of the relevant object of interest. There may be other indicated anomalies for such under or over segmentation. Sometimes, the over-segmentation is due to multiple occurrences of the object of interest and/or the objects are potentially overlapping.

FIG. 4 illustrates a flowchart of an exemplary method of classification implemented by the segmentation quality assessment process, specifically training two classification models, in accordance with an embodiment of the disclosed quality assessment system and method. Specifically illustrated in FIG. 4 is an example embodiment of training two classification models that are used in classifying segmented patches and also training the respective segmentation algorithm being implemented to segment the objects of the received images. In the example embodiment, the first classification model (i.e. Model 1) trains the set of "good segmentation" patches as well as "over-segmented" patches. Model 1 can classify a patch into "not-over-segmented or "over-segmented". The second classification model (i.e. Model 2) is trained with the set of "good segmentation" patches or "under-segmented" patches. Hence, Model 2 is trained to classify a patch into "not-under-segmented" or "under-segmented" having the hindsight training of identifying "good segmentation" patches or "under-segmented" patches during training.

The flowchart of FIG. 4 depicts how these two models (i.e. Model 1 and Model 2) are iteratively applied to each test patch$_i$ of one or more objects of an image. The example method shown in FIG. 4 applies Model 1 to each test patch$_i$. The workflow then applies Model 2 to each same test patch$_i$ of an object. The example method begins at step 5. In step 6, the quality assessment system processor iteratively computes intensity and texture features per $patch_i$ (an example set of intensity and texture features are listed in Table 1). The system advances to step 9 to determine if the $patch_i$ is over-segmented. If so, the system next determines if the $patch_i$ is under-segmented in step 10. If so, the system will label the patch as badly segmented patch in step 11. So in such case, the $patch_i$ while determined to be over-segmented in step 9, it includes objects that were either not segmented, were not segmented properly or were under-segmented in step 10. Therefore, the $patch_i$ is labelled as badly segmented as indicated in step 11. In step 8, the system will adjust one or more segmentation algorithm parameters to refine segmentation. The system next advances to step 16 to advance to the next test $patch_i$ in step 16 by incrementing a $patch_i$ with counter i=i+1. If a determination is made that there is another $patch_i$ to analyze, the system repeats the same workflow of FIG. 4, for $patch_{i+1}$, beginning at step 5. Otherwise the process ends at step 17.

In another scenario possible during implementation of the example method shown in FIG. 4, in step 9 the system determines if patch is over-segmented. Next the system determines if $patch_i$ is under-segmented in step 10, in which case it is not, the system proceeds to label patch as over-segmented patch in step 7. Next, the system will adjust the segmentation algorithm in step 8, to adjust one or more of respective parameters to refine segmentation. The system would next proceed to end that round of the workflow (unless it otherwise advances to the next test patch in step 16 by incrementing a $patch_i$ with counter i=i+1 of the object advancing, determining if there is another $patch_i$ to analyze and if so, repeating the same workflow of FIG. 4 for $patch_{i+1}$, beginning at step 5). Otherwise the process ends at step 17.

In yet another scenario for a test $patch_i$ undergoing the workflow shown in FIG. 4, the system computes intensity and texture features per patch in step 6. The system determines if $patch_i$ is over-segmented in step 9 and it is determined that it is not over-segmented in step 9. The system next proceeds to determine if $patch_i$ is under-segmented in step 12. If the patch is found to be under-segmented in step 12, the system next labels the $patch_i$ as an under-segmented $patch_i$ in step 13. Next the system will adjust one or more of the segmentation algorithm parameters to refine the respective level of segmentation in step 14, which essentially trains the algorithm to refine the objects more accurately, such that the level of segmentation is essentially good segmentation that can be properly analyzed. The system next advances to the next test $patch_i$ in step 16 by incrementing a $patch_i$ with counter i=i+1 of the $patch_i$ advancing, and determining whether there is another $patch_i$ to analyze and if so, repeating the same workflow of FIG. 4 for $patch_{i+1}$, beginning at step 5. Otherwise the process ends at step 17.

In yet another scenario, if the system determines in step 9 that the $patch_i$ is not over-segmented, and also determines in step 12 that $patch_i$ is not under-segmented, it will next label $patch_i$ as a good segmentation in step 15. The system next advances to the next test $patch_i$ in step 16 by incrementing a $patch_i$ with counter i=i+1 of the $patch_i$ advancing, and determining whether there is another $patch_i$ to analyze and if so, repeating the same workflow of FIG. 4 for $patch_{i+1}$, beginning at step 5. Otherwise the process ends at step 17.

Hence, in summary, the workflow in FIG. 4 depicts an embodiment in which two classification models are applied to each patch in order to train the algorithm. The workflow applies model 1 to each test patch. It then applies model 2 to the same patch. If a patch is labeled as "over-segmented" by model 1, the workflow applies model 2 to the patch. If model 2 labels the patch as "not-under-segmented", the patch is labeled as "over-segmented". If model 2 labels the patch as "under-segmented", the patch is labeled as "badly segmented".

If a patch is labeled as "not-over-segmented" by model 1, the workflow applies model 2 to the patch. If model 2 labels the patch as "under-segmented", the patch is labeled as "under-segmented". If model 2 labels the patch as "not-under-segmented", the patch is labeled as "good segmentation".

Referring to FIG. 4A-1 and FIG. 4A-2, which in unison represent an illustration of a single flowchart delineating an exemplary method (when interpreted in unison) of classification of segmentation as implemented by the segmentation quality assessment process, in accordance with an embodiment of the disclosed system and method. The process begins at step 70 in FIG. 4A-2. The system computes intensity and texture features per patch in step 71. The quality assessment system next determines texture features and performs extraction in step 72. The quality assessment system next determines if the subject $patch_i$ is over-segmented in step 73. If so, the system next determines if $patch_i$ is over-segmented and also badly segmented in step 74. If so, the system will label $patch_i$ as a bad segmentation in step 75. The system will next determine if there exists another $patch_i$ to analyze by advancing the counter i=i+1. If so, the system will repeat the process again beginning at step 71. Otherwise, the process ends at step 90.

Referring back to step 74, if the system determines that $patch_i$ is NOT over-segmented and badly segmented, it next proceeds to step 76 at which the system next determines if $patch_i$ is not over-segmented based on a predetermined threshold value. If not, the system labels $patch_i$ over-segmented in step 77 and proceeds to step 88 to determine if there is another $patch_i$ to analyze by advancing the counter i=i+1. If not, the process ends at step 90 or otherwise the process repeats beginning with step 71.

However, if the system determines that $patch_i$ is not over-segmented based on a predetermined threshold value in step 76, it next proceeds to step 78, to determine if $patch_i$ is a good segmentation in step 78. If so, the system labels $patch_i$ a good segmentation in step 80. Otherwise it labels $patch_i$ as bad segmentation in step 79. In either case, once $patch_i$ is labeled a good or bad segmentation in step 79 or 80, as applicable, the system next proceeds to step 88 to determine if there is another $patch_i$ to analyze by advancing the counter i=i+1. If not, the process ends at step 90 or otherwise the process repeats beginning with step 71.

Referring back to step 73, if the system determines that the $patch_i$ is not over-segmented it proceeds to determine if the patch is under-segmented in step 81. If so, the system checks if the patch is under-segmented and badly segmented in step 82. If so, the system labels the $patch_i$ as bad segmentation in step 84 and next proceeds to step 88 to determine if there is another $patch_i$ to analyze by advancing the counter i=i+1. If not, the process ends at step 90 or otherwise the process repeats beginning with step 71.

Referring back to step 81, if the system determines that $patch_i$ is not under-segmented in step 81, it next determines if the patch is badly segmented in step 85. If so, it labels the patch as bad segmentation in step 84 and next proceeds to step 88 to determine if there is another $patch_i$ to analyze by advancing the counter i=i+1. If not, the process ends at step 90 or otherwise the process repeats beginning with step 71.

Referring back to step 85, if the system determines that patch$_i$ is not a bad segmentation, it proceeds to step 78 in FIG. 4A-2, to determine if patch$_i$ is a good segmentation in step 78. If so, the system labels patch$_i$ a good segmentation in step 80. Otherwise it labels patch$_i$ as bad segmentation in step 79. In either case, once patch$_i$ is labeled a good or bad segmentation in step 79 or 80, as applicable, the system next proceeds to step 88 to determine if there is another patch$_i$ to analyze by advancing the counter i=i+1. If not, the process ends at step 90 or otherwise the process repeats beginning with step 71.

Referring back to step 82 in FIG. 4A-1, if the system determines patch$_i$ is not under-segmented and not badly segmented, it next determines if patch$_i$ is not under-segmented based on a threshold determination in step 83. If not, the system proceeds to label patch$_i$ as under-segmented in step 87. If so, the step proceeds to step 78 in FIG. 4A-2 to determine if patch$_i$ is a good segmentation in step 78. If so, the system labels patch$_i$ a good segmentation in step 80. Otherwise it labels patch$_i$ as bad segmentation in step 79. In either case, once patch$_i$ is labeled a good or bad segmentation in step 79 or 80, as applicable, the system next proceeds to step 88 to determine if there is another patch$_i$ to analyze by advancing the counter i=i+1. If not, the process ends at step 90 or otherwise the process repeats beginning with step 71.

FIG. 4B illustrates a flowchart including classification and training of a segmentation algorithm as implemented by the segmentation quality assessment process, in accordance with an embodiment of the disclosed system and method.

In certain embodiments, the disclosed system and method includes a training phase which includes further refinement to a segmentation algorithm, as indicated, in which an un-labelled set of one or more patches undergo(es) classification, in accordance with an embodiment of the quality assessment system and method. Beginning with step 95, the system computes intensity and texture features per patch in step 96. The system next determines texture features/extraction in step 97. The system next determines if patch$_i$ is over-segmented in step 98. If not, the system proceeds to determine if patch$_i$ is under-segmented in step 101. If so, the system labels patch$_i$ as under-segmented in step 102. Once patch$_i$ is labelled as under-segmented in step 102, next the system determines if the patch$_i$ is a bad segmentation in step 106. If so, the system labels patch$_i$ as bad segmentation in step 108. The system next adjusts at least one parameter of the segmentation algorithm in order to refine the respective segmentation level in step 109, particularly in view of the labelling of patch$_i$ as bad segmentation in step 106.

It is noted that the threshold parameter is specific to the segmentation algorithm and used in the evaluation and validation of the disclosed quality assessment system and method. In certain embodiments, the disclosed system and method includes the capability to classify "over-segmentation" and "under-segmentation" and to provide guidance to the user and/or developer of the segmentation algorithm so that the appropriate parameters of the segmentation algorithm can be adjusted to correct respective under-segmentation or over-segmentation. The quality assessment system and method can function independently of the specific parameters of a given segmentation algorithm and yet can be configured to adjust such specific parameters in order to improve segmentation quality. In certain embodiments, the disclosed system and method permits the adjustment of the input parameters of the segmentation algorithm for those regions to generate more refined and accurate segmentation results. For example, if the segmentation algorithm implements a threshold parameter to adjust its sensitivity to intensity differences, an additional step is implemented that lowers the threshold value for under-segmented regions and increases it for over-segmented regions. In other embodiments, a further step allows for the adjustment of the input parameters of a segmentation algorithm for those regions to get more refined and accurate segmentation results. For example, if a segmentation algorithm uses a gain parameter, the value of which ranges between 0.0 and 2.0, to adjust its sensitivity to intensity differences, the additional step increases the gain value for under-segmented regions and decreases it for over-segmented regions. In an example implementation, the system runs the segmentation algorithm with the gain parameter set to 0.7. The user and/or computing system evaluates the segmentation results using the disclosed method. This evaluation generates a classification of image regions into good segmentation, under-segmentation, over-segmentation, and bad segmentation. The user and/or computing system can then increase the value of the gain parameter (for instance, to 0.9) for the under-segmented regions and run the segmentation algorithm for those regions. Similarly the user and/or computing system can decrease the value of the gain parameter (for instance, to 0.5) for the over-segmented regions and run the segmentation algorithm for those regions.

The system next proceeds to determine in step 110 if there is another patch$_i$ to analyze by advancing the counter i=i+1. If so, the system repeats the process beginning in step 96. If not, the process ends at step 113.

Referring back to step 98, if the system determines that patch$_i$ is indeed over-segmented, then the system labels patch$_i$ as over-segmented in step 99. The system next determines if patch$_i$ is badly segmented in step 100. If so, (i.e. patch$_i$ is a bad segmentation) the system next proceeds to label patch$_i$ as bad segmentation in step 108. Next, the system proceeds to adjust one or more parameter(s) of the segmentation algorithm to refine segmentation level in step 109. The system next determines in step 110 if there is another patch$_i$ to analyze by advancing the counter i=i+1. If so, the system repeats the process beginning in step 96. If not, the process ends at step 113.

If the system determines that patch$_i$ is not badly segmented in step 100 (hence is labelled as over-segmented in step 99), then the system proceeds to adjust one or more parameter(s) of the segmentation algorithm to refine the segmentation level in step 109 and achieve better quality segmentation results. The system next determines in step 110 if there is another patch$_i$ to analyze by advancing the counter i=i+1. If so, the system repeats the process beginning in step 96. If not, the process ends at step 113.

Referring back to step 101, if the system determines that the patch$_i$ is not under-segmented in step 101, the system next determines if the patch$_i$ is not over-segmented in step 103. If not, the system proceeds to step 105 to determine if patch$_i$ is not under-segmented. If yes, the system proceeds to step 107 to determine if patch$_i$ is a good segmentation. If so, the system labels patch$_i$ as a good segmentation in step 104. The system next proceeds to determine in step 110, if there is another patch$_i$ to analyze by advancing the counter i=i+1. If so, the system repeats the process beginning in step 96. If not, the process ends at step 113.

Referring back to step 103, if the system determines that the patch$_i$ is not over-segmented, then the system proceeds to step 104 and labels patch$_i$ a good segmentation. Next the system proceeds to determine in step 110, if there is another patch$_i$ to analyze by advancing the counter i=i+1. If so, the system repeats the process beginning in step 96. If not, the process ends at step 113.

Referring back to step 101, if the system determines that the patch$_i$ is not under-segmented in step 101, then the system determines if patch$_i$ is not over-segmented in step 103. If not, the system next determines if patch$_i$ is not under-segmented in step 105. If not, the system proceeds to determine if patch$_i$ is a bad segmentation in step 106. If so, the system proceeds to step 108 to label patch$_i$ as a bad segmentation in step 108. It next adjusts the parameter of the segmentation algorithm to refine the respective segmentation level in step 109, in order to improve the quality of segmentation, and next proceeds to determine in step 110, if there is another patch$_i$ to analyze by advancing the counter i=i+1. If so, the system repeats the process beginning in step 96. If not, the process ends at step 113.

Referring back to step 106, if the system determines the patch$_i$ is not a bad segmentation, it next determines if patch$_i$ is a good segmentation in step 107. If not, it does not even classify the patch$_i$ in step 111. If the system instead finds patch$_i$ is a good segmentation in step 107, it next proceeds to step 104 to label patch$_i$ a good segmentation in step 104. Next the system proceeds to step 110 to determine if there is another patch$_i$ to analyze by advancing the counter i=i+1. If so, the system repeats the process beginning in step 96. If not, the process ends at step 113.

It is noted that disclosed quality assessment system and method may implement two sets of whole-slide images obtained from two different cancer types for example, WHO Grade II LGG and LUAD. The whole-slide images may be obtained from TCGA data set. These and other sources of such whole-slide images are generally known in the medical industry.

In accordance with another embodiment of the disclosed quality assessment system and method associated with quality control in segmentation of image data associated with objects, for example, for histopathology images of a particular cancer type, a computerized nucleus segmentation method is disclosed. The method first segments nuclei in hematoxylin and eosin (i.e. H&E stained) whole-slide tissue images. Next, the method involves application of color normalization in the L*a*b color space on input images using a properly stained template image. Next, the method extracts the hematoxylin (stained on nuclei mainly) channel through a color decomposition process. A localized region-based level set method with a user-defined threshold value determines the contour of each nucleus.

In cases where several nuclei are clumped together, a hierarchical mean shift algorithm is employed to separate the clump into individual nuclei. The threshold parameter in the level set method significantly affects the quality of segmentation. The threshold parameter is specific to the segmentation algorithm and used in the evaluation and validation of the disclosed quality assessment system and method. In certain embodiments, the disclosed system and method includes the capability to classify "over-segmentation" and "under-segmentation" and to provide guidance to the user and/or developer of the segmentation algorithm so that the appropriate parameters of the segmentation algorithm can be adjusted to correct respective under-segmentation or over-segmentation. The quality assessment system and method can function independently of the specific parameters of a given segmentation algorithm and yet can be configured to adjust such specific parameters (for example, any of the listed intensity features, gradient features, and/or mean values as shown in Table 3) in order to improve segmentation quality.

In certain embodiments, the disclosed system and method permits the adjustment of the input parameters of the segmentation algorithm for those regions to generate more refined and accurate segmentation results. For example, if the segmentation algorithm implements a threshold parameter to adjust its sensitivity to intensity differences, an additional step is implemented that lowers the threshold value for under-segmented regions and increases it for over-segmented regions.

In a disclosed embodiment, a further step allows for the adjustment of the input parameters of a segmentation algorithm for those regions to get more refined and accurate segmentation results. For example, if a segmentation algorithm uses a gain parameter, the value of which ranges between 0.0 and 2.0, to adjust its sensitivity to intensity differences, the additional step increases the gain value for under-segmented regions and decreases it for over-segmented regions. In an example implementation, the system runs the segmentation algorithm with the gain parameter set to 0.7. The user evaluates the segmentation results using the disclosed method. This evaluation generates a classification of image regions into good segmentation, under-segmentation, over-segmentation, and bad segmentation. The user can then increase the value of the gain parameter (for instance, to 0.9) for the under-segmented regions and run the segmentation algorithm for those regions. Similarly the user can decrease the value of the gain parameter (for instance, to 0.5) for the over-segmented regions and run the segmentation algorithm for those regions.

FIG. 5 shows micro photographic images of the segmentation results generated by two different threshold values in accordance with the example methods as described for example, in FIGS. 4A-4B. In particular, FIG. 5 illustrates sample images providing comparison of segmentation results using different threshold parameters for segmentation, in accordance with an embodiment of the disclosed quality assessment system and method. The top row 124 shows that segmentation using a small threshold parameter results in some light-colored nuclei being neglected. The bottom row 125 indicates that the segmentation method using a larger threshold parameter even segments non-nuclei area.

The (blue) polygons 122 in the images delineated by dashed-line circles 127, 130 are the segmentation results obtained using a small threshold value. The red polygons 121 show the results using a large threshold value, for example polygons 121 enclosed in dashed-line circles 128, 129. In the images in the top row 124 of FIG. 5, some light-colored nuclei have been missed using the low threshold value during segmentation. In the areas highlighted with a dotted-line circle 127, only six nuclei 122 were segmented with the low threshold value. There are actually 10 nuclei in that area. The blue result 122 in this case represents a bad result with under-segmentation. After increasing the threshold value, the result 121 (red result) shown in dotted-line circle 128 is considered good-quality segmentation. The images in the second row 125 of FIG. 5, show an example of over segmentation; the larger threshold value (the red result 121 shown in circle 129) would lead to segmentation of non-nuclear material. By decreasing the threshold parameter value, the segmentation result (the blue result 122 shown for example in dashed-line circle 130) is improved. Therefore, if the quality assessment system and method accurately predicts whether a patch is under-segmented or over-segmented, this information can be used to guide the selection of algorithm parameters to improve segmentation results as well.

In various example implementations, classification models were generated using at least two classification methods. The results were compared using for example, random forest and SVM classification models. Generally, both random forest and SVM have each their own pros and cons. SVM (Support Vector Machine) is a supervised learning model with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier (although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on which side of the gap they fall.

In addition to performing linear classification, SVMs can efficiently perform a non-linear classification using what is called the kernel trick, implicitly mapping their inputs into high-dimensional feature spaces.

Random forest is an ensemble learning method for classification that works by bagging multiple decision trees and outputting the classification label by taking the majority vote. Bootstrap aggregating, also called bagging, is a machine learning ensemble meta-algorithm designed to improve the stability and accuracy of machine learning algorithms used in statistical classification and regression. It also reduces variance and helps to avoid overfitting. Although it is usually applied to decision tree methods, it can be used with any type of method. Bagging is a special case of the model averaging approach.

In random forest, each of the decision trees is built on a bootstrap sample of the training data using a randomly selected subset of variables. It has the distinct advantage that decision trees' habit of overfitting to their respective training set can be avoided. Furthermore, since there are no parameters to be tuned, the runtime for training a random forest is usually brief. An example implementation of random forest is use of Statistics and Machine Learning Toolbox™ in MATLAB. In example implementations, the number of trees were set to 1000. Other example implementations involved the evaluation of a random forest with 10,000 trees. The results showed that the performance of the random forest did not improve much.

Support Vector Machine (SVM) is a supervised learning method. It finds hyperplanes in a high-dimensional space that maximizes the distance to the nearest training data point of any classes. In addition to performing linear classification, SVM can efficiently perform a nonlinear classification using a kernel which implicitly maps inputs to high-dimensional feature spaces. SVM can achieve better performance than traditional linear classifiers, such as linear discriminant analysis and logistic regression. Implementations can be accomplished using MATLAB version of LIBSVM with the radial basis function kernel. The kernel parameter gamma and cost in certain examples were selected using 5-fold cross-validation.

In an example implementation of an embodiment of the disclosed quality assessment system and method, forty images segmented by the segmentation method were randomly selected from each cancer type. A collaborating pathologist manually labels regions (also referred to as regions of interest [ROIs] throughout). Since the whole-slide images in The Cancer Genome Atlas (TCGA) were collected from different tissue source sites, the stratified sampling step was implemented in example implementations to create the training dataset.

The pathologist next reviewed the segmented images using for example, QuIP application and manually labeled regions good-quality-segmentations, under-segmented, and over-segmented in each image in the training set as described in FIGS. 4-4B. QuIP for example, is a web-based suite of tools and services that are designed to support analysis, management, and query of pathology image data and image analysis results (http://www.quipl.bmi.stonybrook.edu; https://www.github.com/SBU-BMI/quip_distro.git). QuIP provides web applications and interfaces for users to interact with and visualize images and analysis results. The web interfaces and applications are backed by a database, which indexes metadata about whole-slide tissue images and results from segmentation and feature computation pipelines. Users can view high-resolution whole-slide tissue images and segmentation results using the caMicroscope application. A user requests an image, and selects analysis results from an analysis algorithm and views the analysis results overlaid on the image as polygons. The user pans and zooms in the image, mark-ups regions using rectangular or freehand drawing tools, annotates the regions with a label, and saves the results in the database.

Figure 5A:
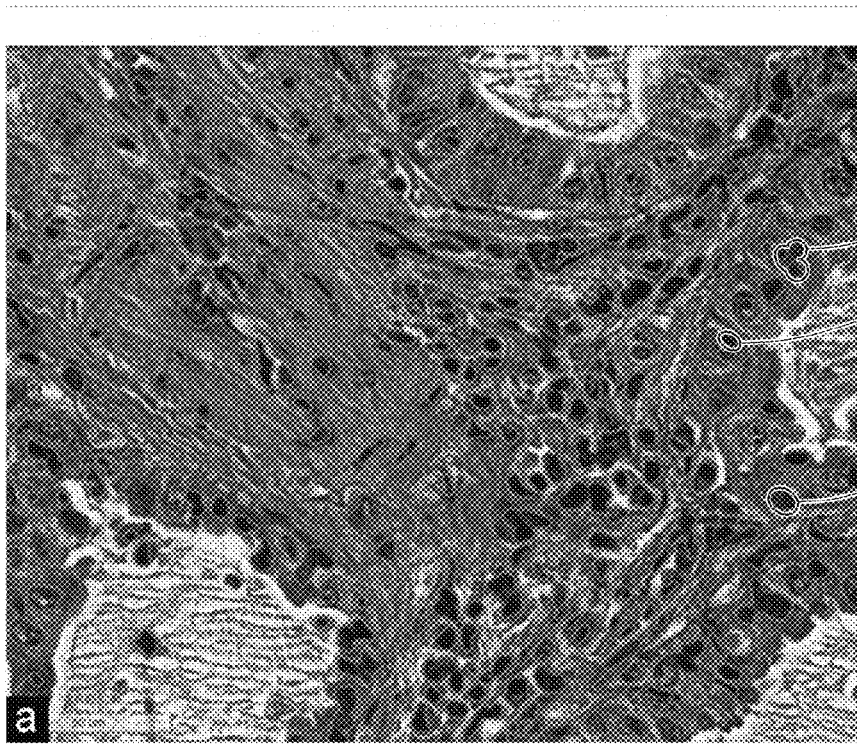
FIGS. 5A-5B show micro photographic images of tissue samples using a CaMicroscope application used to view segmentation results and mark-up regions, in accordance with an embodiment of the quality assessment system and method.
Figure 5B:
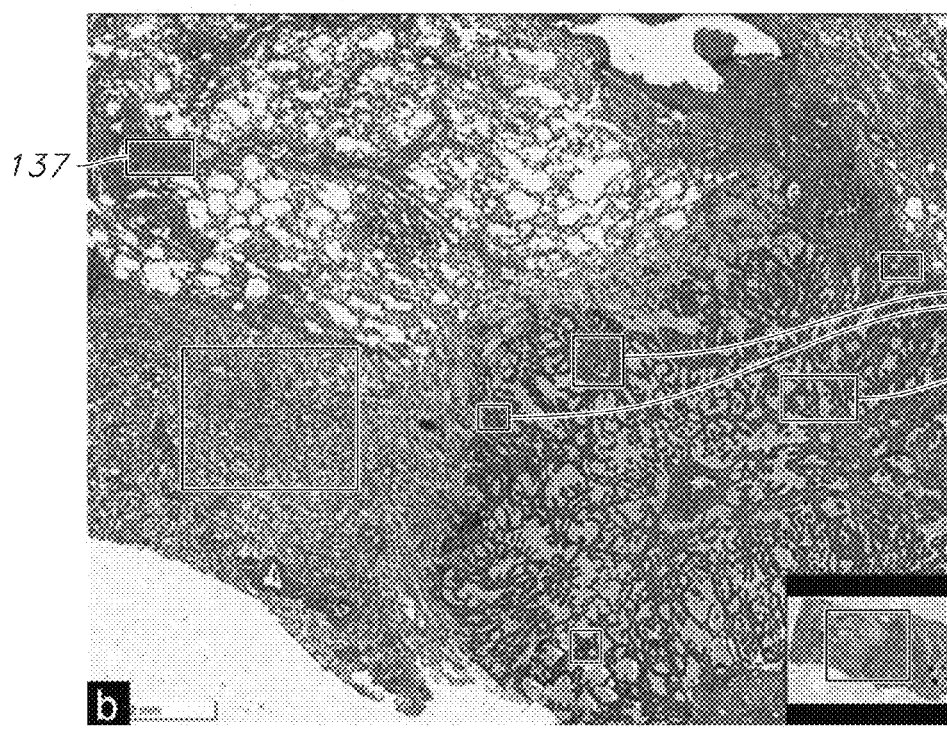

Shown in FIGS. 5A-5B are micro photographic images viewed using a CaMicroscope application in QuIP that assist with viewing images, segmentation results, and mark-up regions in accordance with an embodiment of the quality assessment system and method.

In particular, FIGS. 5A-5B show micro photographic images of the main image viewing and markup interface with segmentation results shown in FIG. 5A, and regions marked up by the pathologist in FIG. 5B in whole-slide tissue image. Segmentation results displayed as polygons 135 overlaid on whole-slide tissue images are shown in FIG. 5A. Regions marked-up by a pathologist 137 in order to create a training set and train a model classification are shown in FIG. 5B.

It is noted that in the regions shown with good-segmentation results, most of the nuclei were segmented correctly. In the under-segmented regions, some nuclei were not segmented or single nuclei were segmented as multiple nuclei. In the over-segmented regions, some non-nucleus material was delineated as nuclei. Regions with no tissue (e.g., regions containing slide background and image acquisition artifacts) were not taken into consideration in the example implementation. Some regions, such as necrosis regions or blood clots, may have tissue but no nuclei. If there are segmented objects in such regions, they are labeled over-segmented regions; otherwise, they are labeled "region with good-segmentation results." In example implementations, some regions with no nuclei were over-segmented, but there were few regions with no segmentation results.

After the manually labeled regions were obtained, non-overlapping patches of 512×512 pixels were extracted from each of the regions. Some sample patches of WHO Grade II LGG with segmentation results for each category are shown in FIGS. 5A-5B. FIG. 5A shows the main image viewing and mark-up interface with segmentation results, while regions marked-up by the pathologist in a whole-slide tissue image is shown in FIG. 5B.

Table 2 below lists the number of manually labeled ROIs and the number of patches for each cancer type and each segmentation quality category used in example implementations of the quality assessment system and method. The number of patches for an ROI was determined by the size of the ROI. Larger ROIs generated more patches. In Table 2, there are fewer patches generated for Lung adenocarcinoma (LUAD) even though there are more regions labeled for LUAD. This is because tissue images from the WHO Grade II LGG (Low Grade Glioma) cases have usually more uniform texture than images from the LUAD cases. Hence, larger regions were selected in WHO Grade II LGG images. Most meningiomas are benign (WHO grade I), although up to one-fifth of such tumors are classified as atypical (World Health Organization [WHO] grade II) or malignant (WHO grade III).

Table 2: provides a list of Information for Manual Labeled Regions of Interest.

Table 3: provides texture features selected to each cancer and category comparison.

TABLE 2

List of information for manual labeled regions of interest

|  | Number of images | Number of manual labeled ROI (number of patches) | | |
|---|---|---|---|---|
|  |  | Good-quality-segmented | Under-segmented | Over-segmented |
| WHO Grade II LGG | 40 | 34 (5819) | 24 (6122) | 17 (4718) |
| LUAD | 40 | 28 (3992) | 39 (3087) | 27 (3121) |

ROI: Regions of interest,
LGG: Lower grade glioma,
LUAD: Lung adenocarcinoma

TABLE 3

Texture features selected in each cancer and category comparison

| Feature name | WHO Grade II LGG | | LUAD | | Feature Name | WHO Grade II LGG | | LUAD | |
|---|---|---|---|---|---|---|---|---|---|
|  | Good versus under | Good versus over | Good versus under | Good versus over |  | Good versus under | Good versus over | Good versus under | Good cersus over |
| r_IntensityMean |  | ✓ | ✓ |  | b_IntensityMean | ✓ |  |  |  |
| r_IntensityMax |  |  |  |  | b_IntensityMax |  |  | ✓ | ✓ |
| r_IntensityMin | ✓ |  | ✓ | ✓ | b_IntensityMin |  |  |  |  |
| r_IntensityStd |  | ✓ | ✓ | ✓ | b_IntensityStd | ✓ | ✓ |  |  |
| r_IntensityEntropy |  |  | ✓ | ✓ | b_IntensityEntropy |  |  | ✓ | ✓ |
| r_IntensityEnergy |  | ✓ | ✓ | ✓ | b_IntensityEnergy |  |  | ✓ |  |
| r_IntensitySkewmess | ✓ |  | ✓ | ✓ | b_IntensitySkewmess | ✓ | ✓ | ✓ | ✓ |
| r_IntensityKurtosis | ✓ |  |  | ✓ | b_IntensityKurtosis | ✓ |  |  | ✓ |
| r_GradientMean | ✓ |  | ✓ |  | b_GradientMean |  |  | ✓ |  |
| r_GradientStd |  | ✓ | ✓ | ✓ | b_GradientStd |  |  |  | ✓ |
| r_GradientEntropy |  |  | ✓ |  | b_GradientEntropy |  |  | ✓ | ✓ |
| r_GradientEnergy |  |  |  | ✓ | b_GradientEnergy |  |  | ✓ | ✓ |
| r_GradientSkewness | ✓ |  |  |  | b_GradientSkewness |  |  |  | ✓ |
| r_GradientKurtosis |  |  |  |  | b_GradientKurtosis |  |  | ✓ | ✓ |
| r_CannyNonZero |  |  |  | ✓ | b_CannyNonZero |  |  | ✓ | ✓ |
| r_CannyMean |  | ✓ | ✓ |  | b_CannyMean |  |  |  |  |
| meanR |  |  |  |  | stdR | ✓ |  |  |  |
| meanG |  | ✓ | ✓ | ✓ | stdG |  | ✓ | ✓ |  |
| meanB |  |  |  | ✓ | stdB |  |  |  | ✓ |

There are 38 texture features in total. For WHO Grade II LGG good versus under, 11 features were selected; for WHO Grade II LGG good versus over, 8 features were selected; for LUAD good versus under, 22 features were selected; and for LUAD good versus over, 21 features were selected.

LGG: Lower grade glioma,

LUAD: Lung adenocarcinoma

"✓" means the feature is selected for the category comparison

There are generally known four tumor grades I, II, III, and IV. The higher the grade, the more malignant the tumor. Tumor grading helps the doctor, patient, and respective caregivers/family members to better understand the patient's condition. It also helps the doctor plan treatment and predict outcome.

The various tumor grades, generally based on the World Health Organization (WHO) grading system, are used in classifying types of tumors and respective level of malignancies. The tumor grades are listed hereinbelow.

Grade I: These are the least malignant tumors and are usually associated with long-term survival. They grow slowly and have an almost normal appearance when viewed through a microscope. Surgery alone may be an effective treatment for this grade tumor. Pilocytic astrocytoma, craniopharnygioma, and many tumors of neurons-gangliocytoma and ganglioglioma, for instance—are examples of grade I tumors.

Grade II: These tumors are slow-growing and look slightly abnormal under a microscope. Some can spread into nearby normal tissue and recur, sometimes as a higher grade tumor.

Grade III: These tumors are, by definition, malignant although there is not always a big difference between grade II and grade III tumors. The cells of a grade III tumor are actively reproducing abnormal cells, which grow into nearby normal brain tissue. These tumors tend to recur, often as a grade IV.

Grade IV: These are the most malignant tumors. They reproduce rapidly, can have a bizarre appearance when viewed under the microscope, and easily grow into nearby normal brain tissue. These tumors form new blood vessels so they can maintain their rapid growth. They also have areas of dead cells in their centers. The glioblastoma multiforme is the most common example of a grade IV tumor.

Tumors can contain more than one grade of cell. The highest, or most malignant, grade of cell determines the grade of the tumor, even if most of the tumor is made up of lower-grade cells.

It is noted that in certain embodiments of the quality assessment system and method can be used to assist pathologist in more accurately assessing and classifying the respective tumor tissue sites. In an embodiment of the example quality assessment system and method, for each good-quality-segmentation, under-segmented, or over-segmented patch, 38 texture features were calculated. Thirty-two of them are the features listed in Table 1 for both the red and the blue channels.

The remaining six features are the mean and standard deviation of the raw pixel value in each of the red, green, and blue channels (feature names: meanR, meanG, meanB, stdR, stdG, and stdB). In order to remove redundant features, stepwise selection of logistic regression was carried out for the good-quality-segmentation versus under-segmented patches and good-quality-segmentation versus over-segmented patches for each cancer type. The selected significant features are listed in Table 3 (shown hereinabove). "r_" or "b_" prefix in a feature name means that the feature was computed for the red channel or the blue channel, respectively. The table illustrates that different cancer types have different sets of significant features. Comparing with the features selected for WHO Grade II LGG, more features were selected for LUAD. This means that it was harder to discriminate between good-quality-segmentation and under-segmented patches or between good-quality-segmentation and over-segmented patches in LUAD than those in WHO Grade II LGG. As a result, more features were needed to be selected.

There are 38 texture features in total. Specifically, for WHO Grade II LGG good versus under, 11 features were selected in the example implementation; for WHO Grade II LGG good versus over-segmentation, 8 features were selected; for LUAD good versus under-segmentation, 22 features were selected; and for LUAD good versus over-segmentation, 21 features were selected.

Even for the same cancer type, different texture features were selected in different segmentation quality comparisons. As shown in Table 3, r_GradientMean (the average of gradient value for the red channel) was selected for WHO Grade II LGG in the good versus under comparison, but not in the good versus over comparison. On the other hand, stdG (representing standard deviation of the raw pixel value for green channel) was selected in the good-segmentation versus over-segmentation comparison, but not in the good-segmentation versus under-segmented comparison.

Figure 6A:
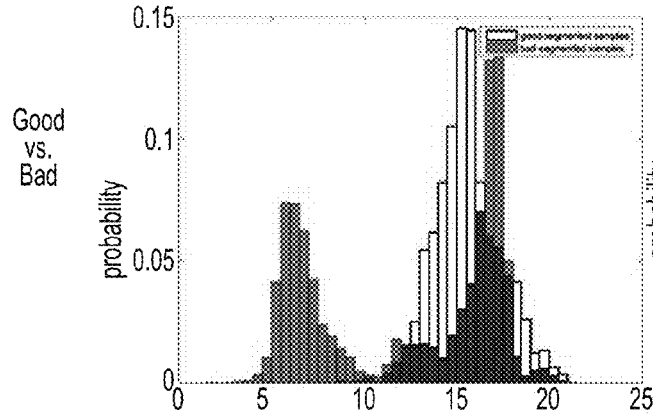
FIGS. 6A-6F illustrate various histograms of texture features for WHO II lower grade glioma based on whether classified as good-segmentation, under-segmented, over-segmented or bad-segmentation quality, in accordance with an embodiment of the quality assessment system and method.
Figure 6D:
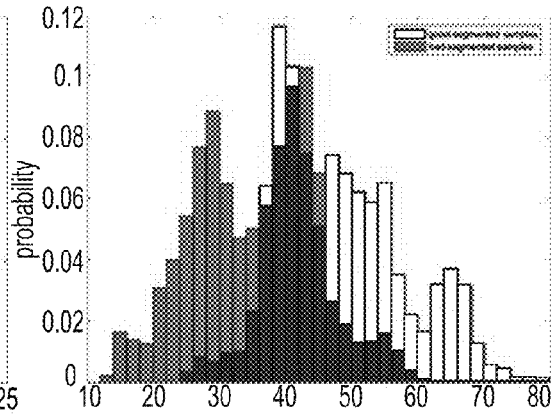
Figure 6B:
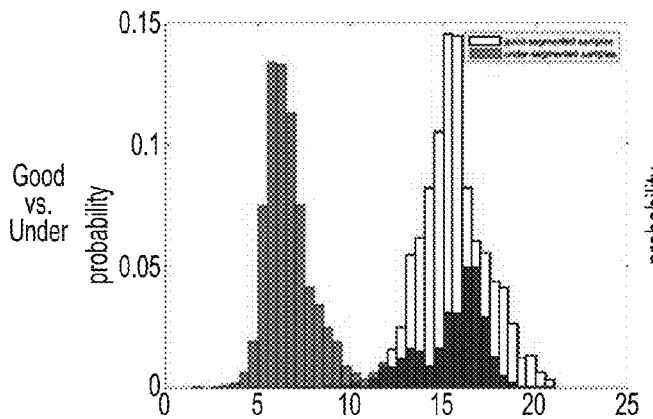
Figure 6E:
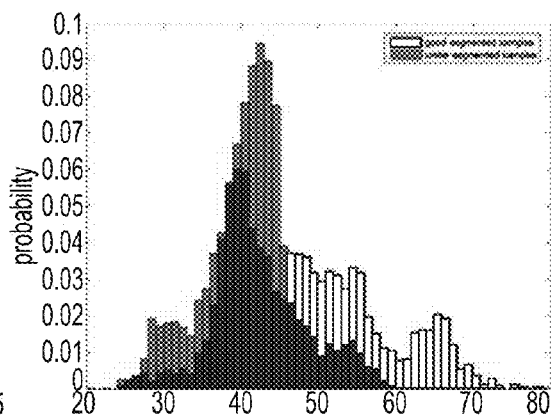

FIGS. 6A-6B illustrate various histograms of texture features for WHO II lower grade glioma based on whether classified as good-segmentation, under-segmented, over-segmented or bad-segmentation quality, in accordance with an embodiment of the quality assessment system and method.

Figure 6C:
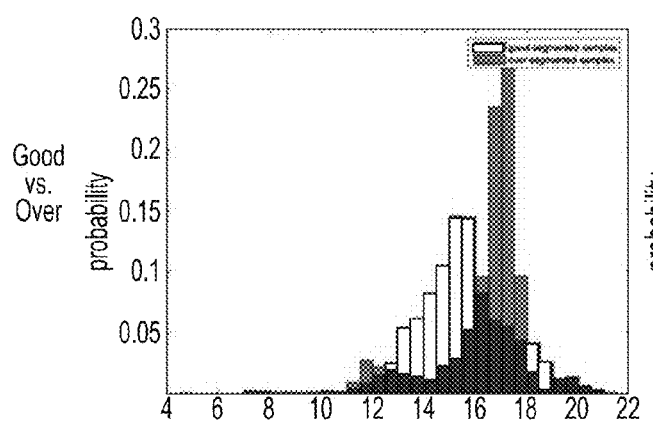
Figure 6F:
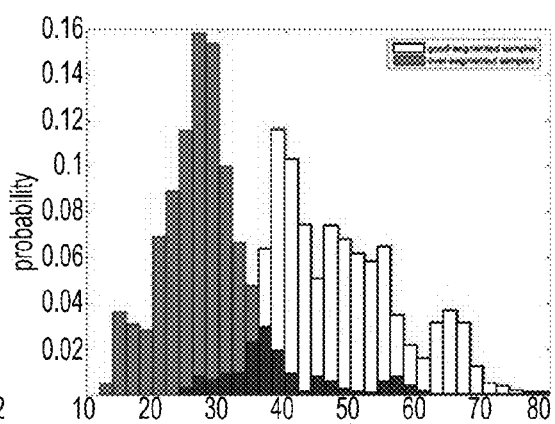

The histograms as shown in FIGS. 6A-6F illustrate why the two features were selected in only one of the two category comparisons and the system further divides the bad-quality-segmentation group into two subgroups. FIG. 6B illustrates that patches with r_GradientMean<10 are all under-segmented patches and all the patches with good-quality segmentation have r_GradientMean >10. In particular, patches with smaller variation in the red channel tended to be under-segmented patches. There is still a small portion of under-segmented patches having large variation in the red channel, which is caused by the texture variation across different slides. Feature r_GradientMean is able to distinguish most of the under-segmented patches from patches with good-quality segmentation. However, as shown in FIG. 6C, r_GradientMean could not differentiate between over-segmented patches and patches with good-quality segmentation. If under-segmented patches are combined with over-segmented patches and grouped together as patches with bad-quality segmentations, as shown in FIG. 6A, there would be significant overlap between the histogram of the patches with bad-quality segmentations and that of the patches with good-quality segmentations. By dividing the bad-quality-segmentation group into two subgroups, a practitioner can more easily differentiate one particular subgroup of bad-quality-segmentation patches from good-quality-segmentation patches. Similarly, feature stdG provided more information when distinguishing good-quality-segmentation patches from over-segmented ones but was less informative when dividing the patches into good-quality-segmentation group and under-segmented group or bad-quality-segmentation group.

Classification results: In an example implementation of an embodiment of the disclosed quality assessment system and method, for each cancer type, SVM and random forest for good quality segmentation group and under/over-segmented group were trained using the selected significant texture features. Since the primary purpose of the disclosed pipeline is to detect good-quality segmentation patches in a whole-slide image, the system, in certain embodiments, separates the good-quality segmentation group from all the subgroups of bad segmentations (the under-segmented subgroup and the over-segmented subgroup). The training accuracy, which is computed as the average of 10-fold cross validation accuracy, and the test accuracy are listed in Table 4, shown hereinbelow. The accuracy is defined as the sum of true positive and true negative divided by the total number of cases in the two categories of each training or test set. SVM achieved higher training accuracy than random forest. However, random forest achieved better test accuracy in most of the cases, especially for the test of LUAD under remover. This indicates that the SVM is easier to be overfitted than random forest.

Although the training accuracies of the under remover models (from the SVM and random forest) with the LUAD images were above 90%, their test accuracies were low, especially that of the model implemented by the SVM. This set of results is not surprising, given the wide variety of cell appearances in the LUAD images and the similarity of texture feature for good-quality-segmentation patches and under-segmented patches.

Figure 7:
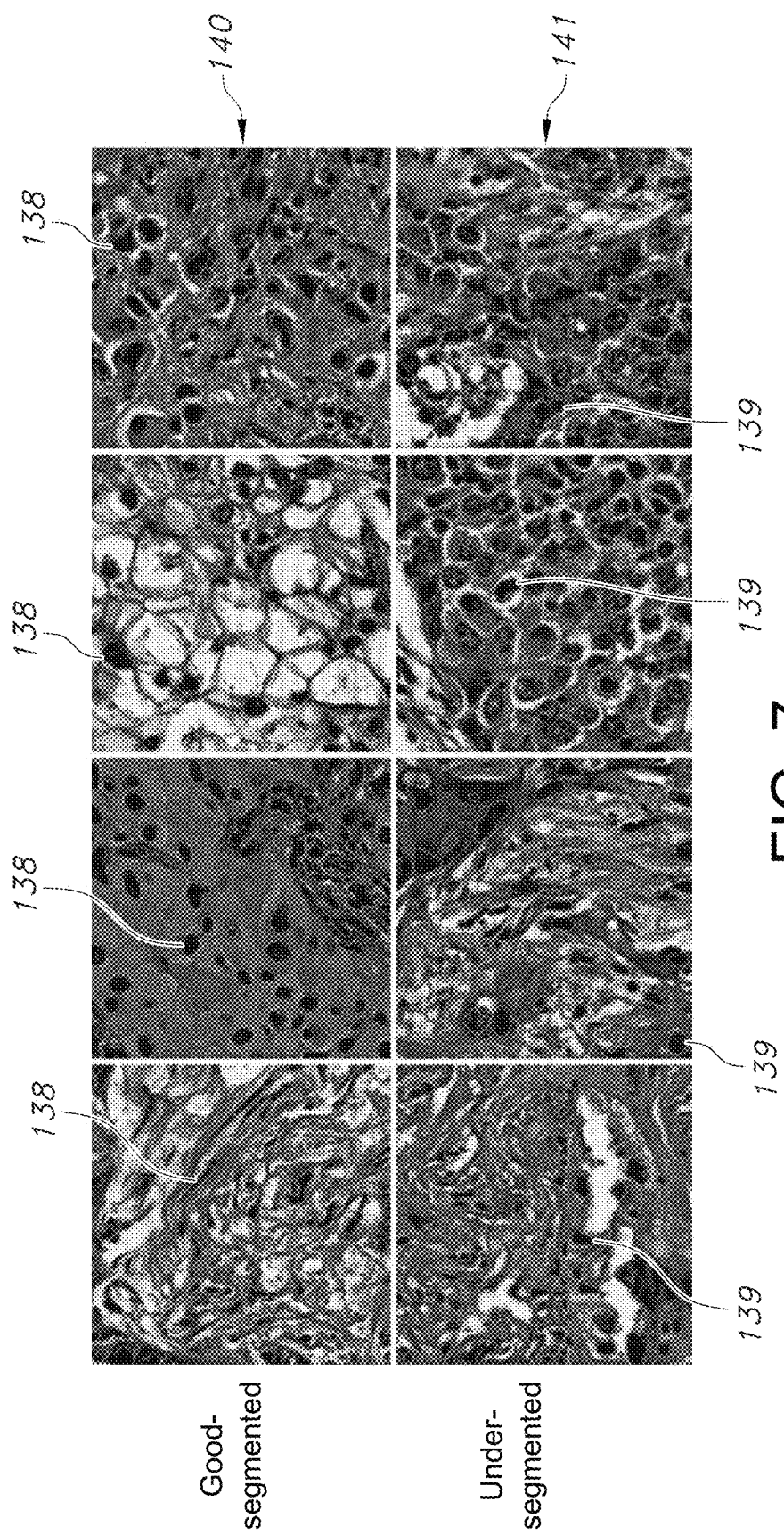
FIG. 7 illustrates tissue samples of misclassified good-quality and under-segmented lung adenocarcinoma patches, in accordance with an embodiment of the quality assessment system and method.

FIG. 7 shows micro photographic sample patches that are misclassified good-quality and under-segmented lung adenocarcinoma patches. The segmented patches 139 in the bottom row 141 are good-quality-segmentation patches that were classified as under-segmented. The patches in top row 140 were under-segmented patches but labeled as good-quality segmentation. Compared with the LGG samples shown in FIG. 1, the size and shape of LUAD nuclei are quite different, across the slides or even within the same slide. It is noted that for the patches generated from a single ROI, their texture features are quite similar. Hence, those patches share the same label with the label given to the ROI. However, the texture appearance of different ROIs circled from a particular slide or from different slides may be very different. As shown in FIG. 7, the segmented patches 138 in the first row 140 were all labeled as good-quality segmentation, but they look significantly different from each other. This fact also increases the difficulty of accurately classifying patches into these two quality categories for example when implemented for LUAD nuclei-based objects.

Table 4: provides performance of Support Vector Machine and Random Forest for each cancer type and category comparison.

TABLE 4

Performance of support vector machine and random forest for each cancer type and category comparison

| | Random forest | | SVM | |
|---|---|---|---|---|
| | Training accuracy (%) | Test accuracy (%) | Training accuracy (%) | Test accuracy (%) |
| WHO Grade II LGG under remover | 97.23 | 97.56 | 99.60 | 93.48 |
| WHO Grade II LGG over remover | 96.59 | 82.43 | 98.21 | 84.40 |
| LUAD under remover | 92.61 | 83.77 | 90.57 | 66.43 |
| (a) LUAD over remover | 86.75 | 83.98 | 91.43 | 84.01 |

TABLE 4-continued

Performance of support vector machine and random forest for each cancer type and category comparison WHO Grade II LGG

| | Random forest Under remover | | SVM Under remover | |
|---|---|---|---|---|
| | Tested as not under-segmented | Tested as under-segmented | Tested as not under-segmented | Tested as under-segmented |
| Good/over | 5286 | 150 | 5029 | 407 |
| Under | 2 | 3039 | 0 | 3041 |

WHO Grade II LGG

| | Random forest Over remover | | SVM Over remover | |
|---|---|---|---|---|
| | Tested as not over-segmented | Tested as over-segmented | Tested as not over-segmented | Tested as over-segmented |
| Good/under | 6064 | 174 | 6146 | 92 |
| Over | 918 | 1321 | 756 | 1483 |

LUAD

| | Random forest Under remover | | SVM Under remover | |
|---|---|---|---|---|
| | Tested as not under-segmented | Tested as under-segmented | Tested as not under-segmented | Tested as under-segmented |
| Good/over | 2644 | 870 | 2308 | 1206 |
| Under | 295 | 1335 | 445 | 1185 |

LUAD

| | Random forest Over remover | | SVM Over remover | |
|---|---|---|---|---|
| | Tested as not over-segmented | Tested as overer-segmented | Tested as not over-segmented | Tested as over-segmented |
| Good/under | 2705 | 851 | 1611 | 945 |
| (b) Over | 365 | 1223 | 395 | 1193 |

The table shows the training accuracy (average of 10-fold cross validation accuracy) and test accuracy of each test. The accuracy is defined as the sum of true positive and true negative divided by the total number of cases in the two categories of each training or test set. The tables present the confusion matrices of each test for overall test set.
LGG: Lower grade glioma,
LUAD: Lung adenocarcinoma,
SVM: Support vector machine
(a) shows the training accuracy (average of 10-fold cross validation accuracy) and test accuracy of each test. The accuracy is defined as the sum of true positive and true negative divided by the total number of cases in the two categories of each training or test set.
(b) present the confusion matrices of each test for overall test set.

Table 5 lists the precision, recall, and F1 score of the three classification categories: good-segmentation, under-segmented, and over-segmented using different methods to classify WHO Grade II LGG and LUAD patches. As shown, for both of the classification methods, the under-segmented category achieved the highest F1 score in the LGG dataset. This is because patches in this category have consistent and differentiable texture features than the other two categories (as shown in FIG. 1, under-segmented sample patches are all light-colored and quite different from patches in the other two categories). By applying the disclosed segmentation quality control system and method to the other WHO Grade II LGG whole-slide images, the regions in which the segmentation method with a given set of parameters may fail to detect all the nuclei can be determined. In other contemplated embodiment(s), a further step increases or decreases the threshold parameter value of the segmentation algorithm for those regions to get more refined and accurate segmentation results. The threshold parameter in the level set method significantly affects the quality of segmentation. The threshold parameter is specific to the segmentation algorithm and used in the evaluation and validation of the disclosed quality assessment system and method. In certain embodiments, the disclosed system and method includes the capability to classify "over-segmentation" and "under-segmentation" and to provide guidance to the user and/or developer of the segmentation algorithm so that the appropriate parameters of the segmentation algorithm can be adjusted to correct respective under-segmentation or over-segmentation. The quality assessment system and method can function independently of the specific parameters of a given segmentation algorithm, and yet can be configured to adjust such specific parameters in order to improve segmentation quality.

In another contemplated embodiment, the disclosed system and method permits the adjustment of the input parameters of the segmentation algorithm for those regions to generate more refined and accurate segmentation results. For example, if the segmentation algorithm implements a threshold parameter to adjust its sensitivity to intensity differences, an additional step is implemented that lowers the threshold value for under-segmented regions and increases it for over-segmented regions.

In yet another contemplated embodiment, a further step allows for the adjustment of the input parameters of a segmentation algorithm for those regions to get more refined and accurate segmentation results. For example, if a segmentation algorithm uses a gain parameter, the value of which ranges between 0.0 and 2.0, to adjust its sensitivity to intensity differences, the additional step increases the gain value for under-segmented regions and decreases it for over-segmented regions. In an example implementation, the system runs the segmentation algorithm with the gain parameter set to 0.7. The user and/or system evaluates the segmentation results using the disclosed method. This evaluation generates a classification of image regions into good segmentation, under-segmentation, over-segmentation, and bad segmentation. The user and/or system can then increase the value of the gain parameter (for instance, to 0.9) for the under-segmented regions and run the segmentation algorithm for those regions. Similarly the user and/or system can decrease the value of the gain parameter (for instance, to 0.5) for the over-segmented regions, and run the segmentation algorithm for those regions.

Due to more heterogeneous collection of nuclei in the LUAD images, the performances of the two classification methods in an example implementation of the disclosed system and method were actually worse with the LUAD segmentation results than with the LGG segmentation results. Among the three categories, the good-quality-segmentation category achieved the highest F1 score. As a result, this determination can assist in identifying regions that are better segmented when processing a LUAD whole-slide image using the disclosed quality assessment system and method.

In yet another contemplated embodiment, combined are the two subgroups of patches with bad segmentations together to form the bad-quality-segmentation group. The respective classifiers are trained for each cancer type by the two classification methods to differentiate good-quality-segmentation patches from the bad-quality-segmentation ones. The performance of the good versus bad classifiers is provided hereinbelow as shown below in Table 6. The good versus bad classifier exhibits better performance in detecting good-quality-segmentation areas in the LGG images. The good versus bad classifier exhibits much worse performance with the LUAD images compared with the performances of the classification models for good-versus-under and good-versus-over. These results demonstrate that dividing the bad-quality-segmentation group into two subgroups not only identifies and provides greater information about how to improve the segmentation quality for the bad-quality-segmentation areas but also achieves better classification performance with certain cancer types, specifically in cancer types in which morphology of nuclei has higher variance.

Also, in general, compared with SVM, random forest has better performance in the LUAD dataset. It achieves higher training accuracy and F1 score. Therefore, applying random forest to create classification models achieves better results. When comparing the results for the two cancer types, the classification results for LGG are better than those for LUAD. This indicates that the disclosed quality segmentation system and method, achieves better results for cancer types exhibiting more consistent texture features. By dividing the bad-quality-segmentation group into under- and over-segmented subgroups, the F1 score for good-quality-segmentation group increases. In addition, the subgroup labels can also be used to guide more precise algorithm parameter selection to improve segmentation results as described hereinbelow, with respect to the segmentation algorithm (at least with respect to FIGS. 4-4B as described hereinabove).

Table 5: lists classification performance for each cancer type in each category.

Table 6: lists classification performance for each cancer type by using good-quality-segmented versus bad-quality-segmented classifications.

TABLE 5

Classification performance for each cancer type in each category

| | Random forest | | | SVM | | |
|---|---|---|---|---|---|---|
| | Precision (%) | Recall (%) | F1 score (%) | Precision (%) | Recall (%) | F1 score (%) |
| WHO Grade II LGG | | | | | | |
| Good | 76.68 | 94.62 | 84.71 | 78.53 | 86.49 | 82.32 |
| Under | 95.56 | 95.43 | 95.49 | 89.94 | 100.00 | 94.71 |
| Over | 98.36 | 59.00 | 73.76 | 98.34 | 66.24 | 79.16 |
| LUAD | | | | | | |
| Good | 74.26 | 76.12 | 75.43 | 65.09 | 58.00 | 61.34 |
| Under | 66.19 | 45.03 | 33.60 | 47.44 | 37.55 | 41.92 |
| Over | 76.79 | 47.29 | 58.54 | 74.45 | 48.62 | 58.82 |

LGG: Lower grade glimoa,
LUAD: Lung adenocarcinoma,
SVML Support vector machine

TABLE 6

Classification performance for each type by using good-quality-segmented versus bad-quality-segmented

| | Random forest | | | SVM | | |
|---|---|---|---|---|---|---|
| | Precision (%) | Recall (%) | F1 score (%) | Precision (%) | Recall (%) | F1 score (%) |
| WHO Grade II LGG | | | | | | |
| Good | 85.16 | 87.05 | 86.09 | 80.65 | 88.65 | 54.43 |
| Bad | 92.05 | 90.81 | 91.43 | 92.68 | 87.08 | 89.80 |
| LUAD | | | | | | |
| Good | 57.64 | 69.89 | 68.74 | 44.00 | 32.76 | 37.56 |
| Bad | 53.61 | 79.99 | 80.79 | 65.09 | 79.05 | 69.71 |

LGG: Lower grade glimoa,
LUAD: Lung adenocarcinoma,
SVML Support vector machine

Hence, effective utilization of whole-slide tissue images in biomedical research hinges on robust methods that extract useful information accurately and reliably. Nucleus segmentation is one of the core image analysis methods employed by researchers to turn image data into knowledge. While computer algorithms generally produce more reproducible results, they often are sensitive to input data and may not produce consistently good segmentation results across image datasets. Therefore, the disclosed quality assessment system and method a quality assessment pipeline evaluates nucleus segmentation quality based on patch-level texture features and achieves more consistent and better segmentation results. The decision to use patch-level texture features is based on the determination that images with similar texture features in tissue usually have comparable segmentation quality given a set of segmentation parameters.

Experimental implementation of the disclosed assessment system and method, demonstrates that the approach is able to predict segmentation quality at the patch level and performs well across a range of images. Since the texture appearance for different cancer types may vary significantly, different texture features are selected for the classification model and the training phase results in a different classification model. While the model trained in various implementations cannot be directly applied to other cancer types, the disclosed quality assessment system and method can be generalized to other cancer types by training new classification models for other cancer types in accordance with different embodiments described hereinabove. By comparing the results of applying the disclosed process on two different cancer types, the disclosed system and method achieved better results when implemented in images with less heterogeneity of nuclei appearance and more consistent texture characteristics. The disclosed quality assessment system and method can be applied to segmentation methods that make use of the texture characteristics of tissue to detect and delineate nuclear boundaries. The system and method can also be applied to other object types retrieved from colossal image data such as for example, structures obtained and identified on Google Maps from GPS systems. However, if a segmentation method adapts its parameters across images, the disclosed system and method may not be suitable to check for segmentation quality since similar texture features may have different segmentation results in such scenarios. Further embodiments are contemplated in which the size, shape, and texture features of the segmented objects in the quality assessment segmentation system and method is further considered and implemented in training the classification models and fine-tuning the segmentation algorithm.

Figure 9:
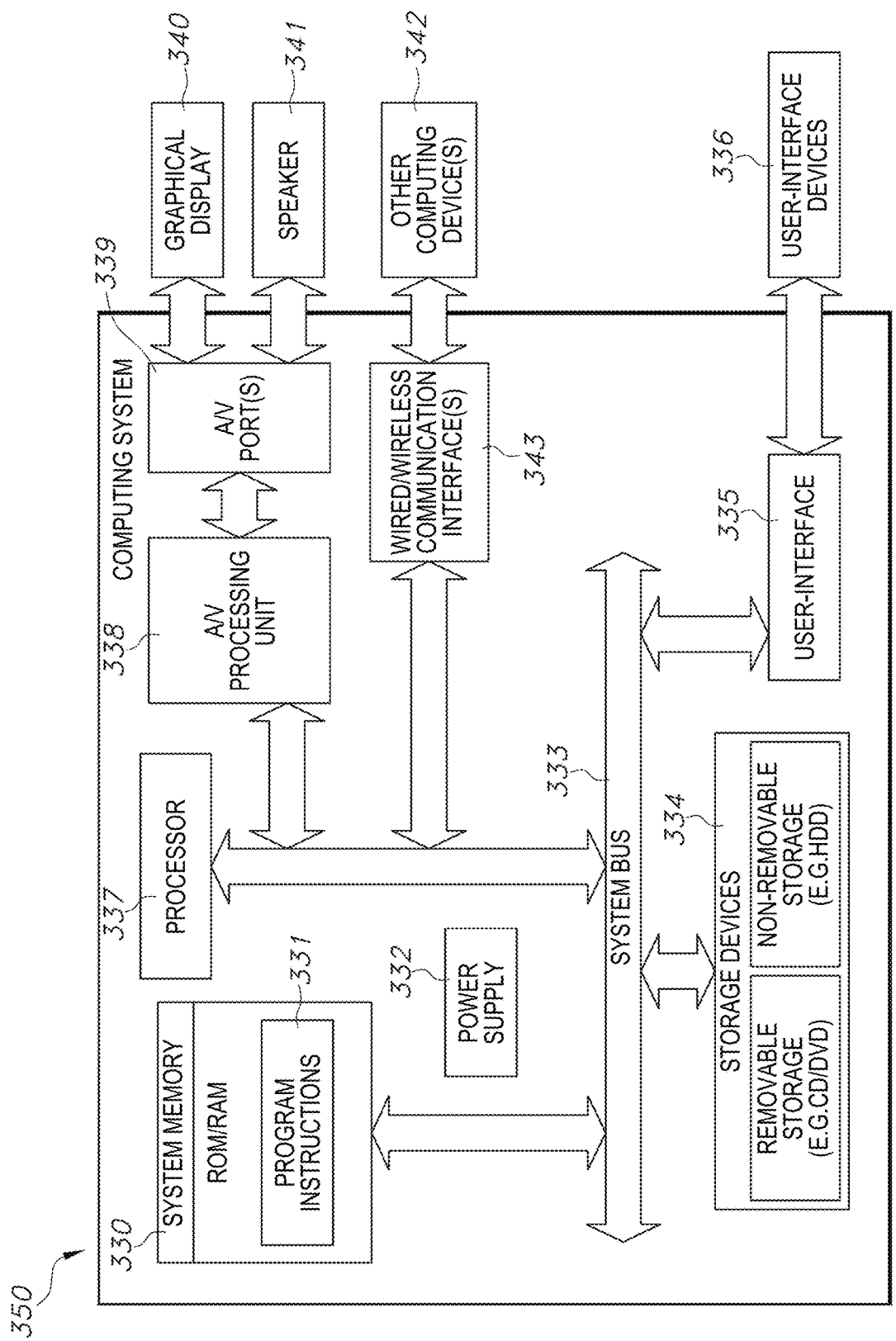
FIG. 9 illustrates a system block diagram in accordance with an embodiment of the quality assessment of segmentation system, including an example computing system.

Shown in FIG. 9 is computing system 350 which may include at least one processor 337 and system memory 330. In an example embodiment, computing system 350 may include a system bus 333 that communicatively connects processor 337 and system memory 330, as well as other components of computing system 350. Depending on the desired configuration, processor 337 can be any type of processor including, but not limited to, a microprocessor (∥P), a microcontroller (C), a digital signal processor (DSP), or any combination thereof. Furthermore, system memory 330 can be of any type of memory now known or later developed including but not limited to volatile memory (such as RAM), non-volatile memory (such as ROM, flash memory, etc.) or any combination thereof.

An example computing system 350 may include various other components as well. For example, computing system 350 includes an A/V processing unit 338 for controlling graphical display 340 and speaker 341 (via A/V port 339), one or more communication interfaces 343 for connecting to other computing systems 342, and a power supply 332. Graphical display 340 may be arranged to provide a visual depiction of various input regions provided by user-interface module 335. For example, user-interface module 335 may be configured to provide a user-interface and graphical display 340 may be configured to provide a visual depiction of the user-interface.

Figure 10:
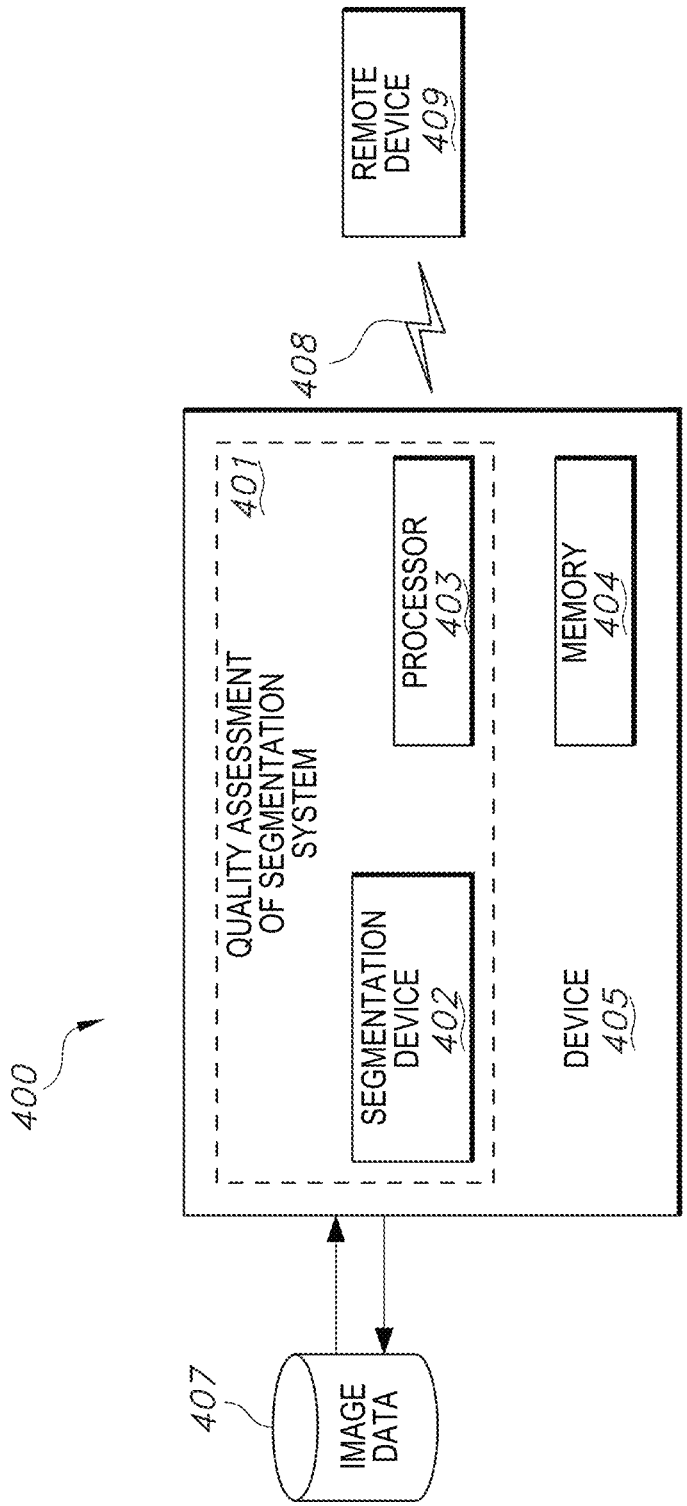
FIG. 10 illustrates a system block diagram including an example computer network infrastructure in accordance with an embodiment of the quality assessment of segmentation system.

FIG. 10 is a simplified block diagram illustrating example components of an example computing system, according to an exemplary embodiment. One or both of the devices 405 and the remote device 409 of FIG. 10, may take the form for example, of computing system 350 shown in FIG. 9. In particular, FIG. 10 illustrates a simplified block diagram illustrating an example computer network infrastructure, according to an exemplary embodiment. In system 400, in certain embodiments device 405, communicates using a communication link 408 (e.g., a wired or wireless connection) to a remote device 409. The device 405 may be any type of device that can receive data and display information corresponding to or associated with the data. For example, the device 405 may be a user computing device, a display or a quality assessment of segmentation engine or quality assessment of segmentation processing device that communicates with the quality assessment of segmentation system 401.

Thus, the device 405 may include a quality assessment engine or system 401 comprising a processor 403, a segmentation device 402, and/or a display that interfaces with stored 2D and/or 3D image datasets 407. The display may be, for example, an optical see-through display, an optical see-around display, or a video see-through display. The processor 403 may receive data from the remote device 409, and configure the data for display on the display device. The processor 403 may be any type of processor, such as a micro-processor or a digital signal processor, for example.

The device 405 may further include on-board data storage, such as memory 404 coupled to the processor 403. The memory 404 may store software that can be accessed and executed by the processor 403, for example.

The remote device 409 may be any type of computing system or transmitter including a laptop computer, a mobile telephone, or tablet computing system, etc., that is configured to transmit data to the device 405. The remote device 409 and the device 405 may contain hardware to enable the communication link 408, such as processors, transmitters, receivers, antennas, etc.

In FIG. 10, the communication link 408 is illustrated as a wireless connection; however, wired connections may also be used. For example, the communication link 408 may be a wired serial bus such as a universal serial bus or a parallel bus, among other connections. The communication link 408 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), and/or Zigbee, among other possibilities. Either of such a wired and/or wireless connection may be a proprietary connection as well. The remote device 408 may be accessible via the Internet and may include a computing cluster associated with a particular web service (e.g., social-networking, photo sharing, address book, etc.).

Figure 8:
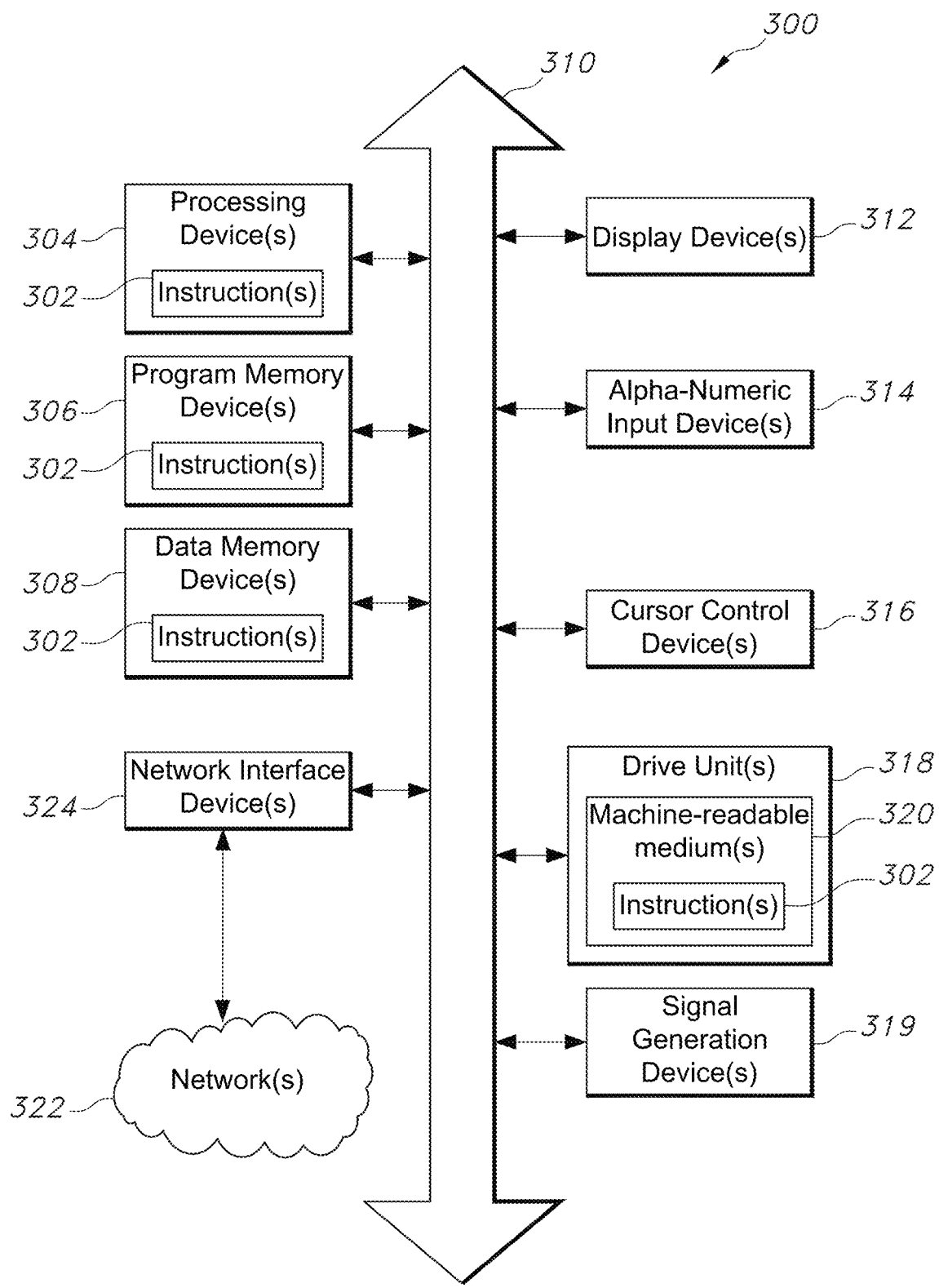
FIG. 8 is a block diagram showing a portion of an exemplary machine in the form of a computing system that performs methods according to one or more embodiments.

FIG. 8 is a block diagram of an illustrative embodiment of a general computing system 300. The computing system 300 can include a set of instructions that can be executed to cause the computing system 300 to perform any one or more of the methods or computer based functions disclosed herein. The computing system 300, or any portion thereof, may operate as a standalone device or may be connected, e.g., using a network 322 or other connection, to other computing systems or peripheral devices.

The computing system 300 may also be implemented as or incorporated into various devices, such as a personal computer (PC), a tablet PC, a personal digital assistant (PDA), a mobile device, a palmtop computer, a laptop computer, a desktop computer, a communications device, a control system, a web appliance, or any other machine capable of executing a set of instructions (sequentially or otherwise) that specify actions to be taken by that machine. Further, while a single computing system 300 is illustrated, the term "system" shall also be taken to include any collection of systems or sub-systems that individually or jointly execute a set, or multiple sets, of instructions to perform one or more computer functions.

As illustrated in FIG. 8, the computing system 300 may include a processor 304, e.g., a central processing unit (CPU), a graphics-processing unit (GPU), or both. Moreover, the computing system 300 may include a main memory and/or program memory 306 and a static memory and/or data memory 308 that can communicate with each other via a bus 310. As shown, the computing system 300 may further include a video display unit 312, such as a liquid crystal display (LCD), an organic light emitting diode (OLED), a flat panel display, a solid state display, or a cathode ray tube (CRT). Additionally, the computing system 300 may include an input device 314, such as a keyboard, and a cursor control device 316, such as a mouse. The computing system 300 can also include a disk drive unit 318, a signal generation device 319, such as a speaker or remote control, and a network interface device 324.

In a particular embodiment or aspect, as depicted in FIG. 8, the disk drive unit 318 may include a machine-readable or computer-readable medium 320 in which one or more sets of instructions 302, e.g., software, can be embedded, encoded or stored. Further, the instructions 302 may embody one or more of the methods or logic as described herein. In a particular embodiment or aspect, the instructions 302 may reside completely, or at least partially, within the main memory 306, the static memory 308, and/or within the processor 304 during execution by the computing system 300. The main memory 306 and the processor 304 also may include computer-readable media.

Figure 11:
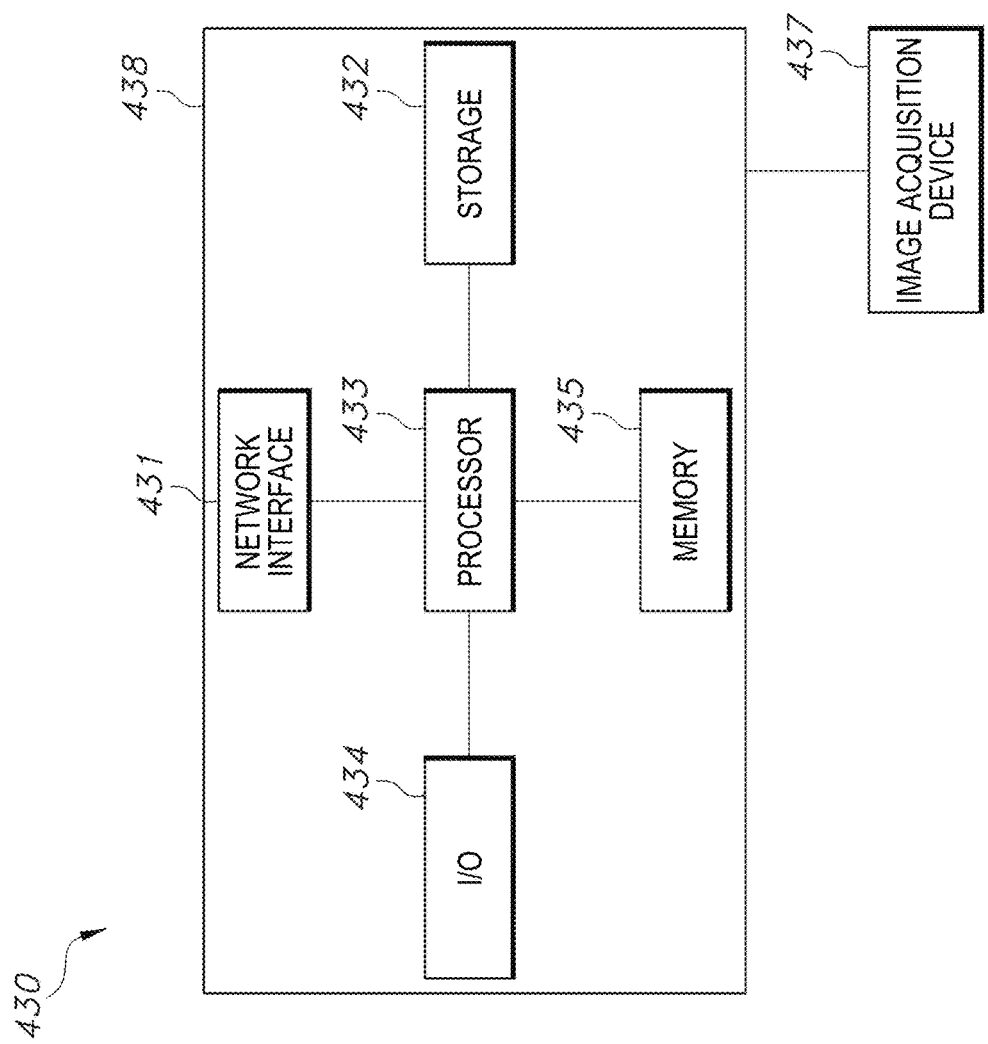
FIG. 11 illustrates a system block diagram of an exemplary computing system, in accordance with an embodiment of the quality assessment of segmentation system.

The above-described methods for the disclosed quality assessment of segmentation system and method may be implemented on a computer, using well-known computer processors, memory units, storage devices, computer software, and other components. A high level block diagram of such a computer is illustrated in FIG. 11. Computer or computing device 430 contains a processor 433 which controls the overall operation of the computing device 438 by executing computer program instructions which define such operation. The computer program instructions may be stored in a storage device 432 (e.g., magnetic disk) and loaded into memory 435 when execution of the computer program instructions is desired. Thus, the method steps implemented by at least the embodiments described with respect to FIGS. 2A-4B, can be defined by the computer program instructions stored in the memory 435 and/or storage 432 and controlled by the processor 433 executing the computer program instructions. For example, the computer program instructions can be implemented as computer executable code programmed by one skilled in the art to perform an algorithm defined by the method steps of FIGS. 2A-4B. Accordingly, by executing the computer program instructions, the processor 433 executes an algorithm defined by the method steps of FIGS. 2A-4B. An image acquisition device 437, such as for example, x-ray imaging device, other scanning device, Global Positioning System (GPS) or similar type of satellite images receiving device, can be connected to the computer or computing device 430 to input images to the computer or computing device 430. It is possible to implement the image acquisition device 437 and the computer or computing device 430 as one device. It is also possible that the image acquisition device 437 and the computing device 430 communicate wirelessly through a network. The computer 430 also includes one or more network interfaces 431 for communicating with other devices via a network. The computing device 430 also includes other input/output devices 434 that enable user interaction with the computing device 430 (e.g., display, keyboard, mouse, speakers, buttons, etc.). One skilled in the art will recognize that an implementation of an actual computer could contain other components as well, and that FIG. 11 is a high level representation of some of the components of such a computer for illustrative purposes. Other system configurations are contemplated for performing the quality assessment system and method.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computing systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computing system processing can be constructed to implement one or more of the methods or functionality as described herein.

It is also contemplated that a computer-readable medium includes instructions 302 or receives and executes instructions 302 responsive to a propagated signal, so that a device connected to a network 322 can communicate voice, video or data over the network 322. Further, the instructions 302 may be transmitted or received over the network 322 via the network interface device 324.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing or encoding a set of instructions for execution by a processor or that cause a computing system to perform any one or more of the methods or operations disclosed herein.

In a particular non-limiting, example embodiment or aspect, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture and store carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Thus, a system and method associated with predicting segmentation quality of objects used in analysis of copious image data including image data at the patch level has been described herein. Even more particularly, a system and method for implementation a novel system and method that trains a classification model in order to predict the respective labeling of segmentation results and accordingly capable of modifying the segmentation process in order to improve and refine segmentation of patches used in analysis of copious image data, has been described.

Although specific example embodiments or aspects have been described, it will be evident that various modifications and changes may be made to these embodiments or aspects without departing from the broader scope of the invention. Accordingly, the specification and drawings are to be regarded in an illustrative rather than a restrictive sense. The accompanying drawings that form a part hereof, show by way of illustration, and not of limitation, specific embodiments or aspects in which the subject matter may be practiced. The embodiments or aspects illustrated are described in sufficient detail to enable those skilled in the art to practice the teachings disclosed herein. Other embodiments or aspects may be utilized and derived therefrom, such that structural and logical substitutions and changes may be made without departing from the scope of this disclosure. This Detailed Description, therefore, is not to be taken in a limiting sense, and the scope of various embodiments or aspects is defined only by the appended claims, along with the full range of equivalents to which such claims are entitled.

Such embodiments or aspects of the inventive subject matter may be referred to herein, individually and/or collectively, by the term "invention" or "embodiment" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description. Moreover, it is further contemplated that claims covering such different combinations can similarly stand on their own as separate example embodiments or aspects, which can be incorporated into the Detailed Description.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 31 CFR § 1.12(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Those skilled in the relevant art will appreciate that aspects of the invention can be practiced with other computer system configurations, including Internet appliances, hand-held devices, cellular or mobile phones, multi-processor systems, microprocessor-based or programmable consumer electronics, network PCs, client-server environments including thin clients, mini-computers, mainframe computers and the like. Aspects of the invention can be embodied in a special purpose computer or data processor that is specifically programmed, configured or constructed to perform one or more of the computer-executable instructions or modules explained in detail below. Indeed, the term "computer" as used herein refers to any data processing platform or device.

Aspects of the invention can also be practiced in distributed computing environments, where tasks or modules are performed by remote processing devices, which are linked through a communications network. In a distributed computing environment, program modules or sub-routines may be located in both local and remote memory storage devices, such as with respect to a wearable and/or mobile computer and/or a fixed-location computer. Aspects of the invention described below may be stored and distributed on computer-readable media, including magnetic and optically readable and removable computer disks, as well as distributed electronically over the Internet or over other networks (including wireless networks). Those skilled in the relevant art will recognize that portions of the invention may reside on a server computer or server platform, while corresponding portions reside on a client computer. For example, such a client server architecture may be employed within a single mobile computing device, among several computers of several users, and between a mobile computer and a fixed-location computer. Data structures and transmission of data particular to aspects of the invention are also encompassed within the scope of the invention.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

The invention claimed is:

1. A system to predict segmentation quality of segmented objects in image data, the system comprising:
   a computing device; and
   a non-transitory memory storing instructions that, when executed by the computing device, cause the computing device to perform operation comprising:
      accessing a trained classifier comprising at least one classification model trained during a training phase, the at least one classification model trained based on a training set of images with segmented objects, the images being partitioned into regions of interest (ROIs), each region of the ROIs being further partitioned into patches, and intensity and texture features being computed at a patch-level for each of the patches;
      receiving a test image with segmented objects during a classification phase in order to assess quality of segmentation of the segmented objects in the test image;
      partitioning the test image into a plurality of patches of a size equivalent to patches of the training set of images;
      computing intensity and texture features of the plurality of patches; and
      applying the trained classifier using the at least one classification model to iteratively classify segmentation quality of each patch of the plurality of patches based on the intensity and texture features of the plurality of patches as computed during classification and the patch-level intensity and texture features as computed during the training phase, the segmentation quality of each patch as classified predicting a segmentation quality of the segmented objects in each patch of the plurality of patches in the test image.

2. The system as recited in claim 1, wherein the operations further comprise labeling each patch of the plurality of patches with the segmentation quality.

3. The system as recited in claim 1, wherein the trained classifier comprises a first classification model and a second classification model trained during the training phase, the first classification model trained using a first subset of the patches comprising patches with good-segmentation and patches with under-segmentation, and the second classification model trained using a second subset of the patches comprising patches with good-segmentation and patches with over-segmentation.

4. The system as recited in claim 3, wherein the operations associated with applying the trained classifier comprise using the first classification model and the second classification model to iteratively classify a first segmentation quality and a second segmentation quality of each patch of the plurality of patches based on the intensity and texture features of the plurality of patches as computed during classification and the patch-level intensity and texture features as computed during the training phase, the first segmentation quality and a second segmentation quality of each patch as classified predicting a segmentation quality of the segmented objects in each patch of the plurality of patches in the test image.

5. The system as recited in claim 4, wherein the operations further comprise:
   combining the first segmentation quality of the first classification model with the second segmentation quality of the second classification model to generate the segmentation quality; and
   labeling each patch of the plurality of patches with the segmentation quality.

6. The system as recited in claim 1, wherein the intensity and texture features of a patch comprise one or more pixel statistics, one or more gradient statistics, one or more edge information, or one or more combinations thereof.

7. The system as recited in claim 6, wherein the one or more pixel statistics comprise one or more of intensity mean, intensity maximum, intensity minimum, intensity standard deviation, intensity entropy, intensity energy, intensity skewness, and intensity kurtosis.

8. The system as recited in claim 6, wherein the one or more gradient statistics comprise one or more of gradient mean, gradient standard deviation, gradient entropy, gradient energy, gradient skewness, or gradient kurtosis.

9. The system as recited in claim 6, wherein the one or more edge information comprise one or more of canny non-zero or canny mean.

10. The system as recited in claim 1, wherein the segmented objects are nuclei or other micro-anatomic structures.

11. A method of predicting segmentation quality of segmented objects in image data, the method comprising:
    accessing a trained classifier comprising at least one classification model trained during a training phase, the at least one classification model trained based on a training set of images with segmented objects, the images being partitioned into regions of interest (ROIs), each region of the ROIs being further partitioned into patches, and intensity and texture features being computed at a patch-level for each of the patches;
    receiving a test image with segmented objects during a classification phase in order to assess quality of segmentation of the segmented objects in the test image;
    partitioning the test image into a plurality of patches of a size equivalent to patches of the training set of images;
    computing intensity and texture features of the plurality of patches; and
    applying the trained classifier using the at least one classification model to iteratively classify segmentation quality of each patch of the plurality of patches based on the intensity and texture features of the plurality of patches as computed during classification and the patch-level intensity and texture features as computed during the training phase, the segmentation quality of each patch as classified predicting a segmentation quality of the segmented objects in each patch of the plurality of patches in the test image.

12. The method as recited in claim 11, wherein the method further comprises labeling each patch of the plurality of patches with the segmentation quality.

13. The method as recited in claim 11, wherein the trained classifier comprises a first classification model and a second classification model trained during the training phase, the first classification model trained using a first subset of the patches comprising patches with good-segmentation and patches with under-segmentation, and the second classification model trained using a second subset of the patches comprising patches with good-segmentation and patches with over-segmentation.

14. The method as recited in claim 13, wherein applying the trained classifier comprises using the first classification model and the second classification model to iteratively classify a first segmentation quality and a second segmentation quality of each patch of the plurality of patches based on the intensity and texture features of the plurality of patches as computed during classification and the patch-level intensity and texture features as computed during the training phase, the first segmentation quality and a second segmentation quality of each patch as classified predicting a segmentation quality of the segmented objects in each patch of the plurality of patches in the test image.

15. The method as recited in claim 14, wherein the method further comprises:
    combining the first segmentation quality of the first classification model with the second segmentation quality of the second classification model to generate the segmentation quality; and
    labeling each patch of the plurality of patches with the segmentation quality.

16. The method as recited in claim 11, wherein the intensity and texture features of a patch comprise one or more pixel statistics, one or more gradient statistics, one or more edge information, or one or more combinations thereof.

17. The method as recited in claim 16, wherein the one or more pixel statistics comprise one or more of intensity mean, intensity maximum, intensity minimum, intensity standard deviation, intensity entropy, intensity energy, intensity skewness, and intensity kurtosis.

18. The method as recited in claim 16, wherein the one or more gradient statistics comprise one or more of gradient mean, gradient standard deviation, gradient entropy, gradient energy, gradient skewness, or gradient kurtosis.

19. The method as recited in claim 16, wherein the one or more edge information comprise one or more of canny non-zero or canny mean.

20. The method as recited in claim 1, wherein the segmented objects are nuclei or other micro-anatomic structures.

* * * * *